United States Patent [19]

Nakano et al.

[11] Patent Number: 5,983,213
[45] Date of Patent: Nov. 9, 1999

[54] DATABASE PROCESSING METHOD AND APPARATUS USING HANDLE

[75] Inventors: Yukio Nakano, Oyama; Masashi Tsuchida, Machida; Masato Asami, Sagamihara; Morihiro Iwata, Tama; Norihiro Hara, Kawasaki; Yoshito Kamegi, Yokohama, all of Japan

[73] Assignee: Hitachi, Ltd., Tokyo, Japan

[21] Appl. No.: 08/975,228

[22] Filed: Nov. 21, 1997

[30] Foreign Application Priority Data

Feb. 21, 1997 [JP] Japan .................................. 9-054155

[51] Int. Cl.⁶ ...................................................... G06F 17/30
[52] U.S. Cl. ................................... 707/1; 707/2; 707/10; 707/103
[58] Field of Search ........................... 707/1, 2, 10, 103, 707/104

[56] References Cited

U.S. PATENT DOCUMENTS 5,754,841  5/1998  Cariño, Jr. .
5,794,250  8/1998  Cariño, Jr. et al. ...................... 707/104
5,890,160  3/1999  Hembry ................................. 707/103

OTHER PUBLICATIONS

Julie Anderson, "The New Database Wars—Informix, IBM Oracle, and Sybase each claims its object relational database will be the best," Informationweek, Dec. 23, 1996.

"Using The New DB2", Don Chamberlin, 1996, pp. 236–241.

Nikkei Electronics, Feb. 27, 1995, pp. 101–114.

"C++ Strategies and Tactics", published by Soft Bank Co., Ltd. Jan. 30, 1994, Robert B. Murray, pp. 57–73.

Primary Examiner—Paul V. Kulik
Attorney, Agent, or Firm—Beall Law Offices

[57] ABSTRACT

A request accepting server accepts a processing request of data of a predetermined type, analyzes the request, and allocates a process corresponding to the request to either one of the request accepting server and at least one database processing server. A handle is a control block to manage a storage area of data as a processing target and has a server in which the processing target data has been stored and information regarding its storing position. When the processing target data corresponding to the processing request is processed in accordance with the processing request, the request accepting server executes a process according to the processing request by using a handle regarding the processing target data. When an entity of the processing target data is necessary, the entity of the processing target data is obtained on the basis of the handle and is processed.

24 Claims, 20 Drawing Sheets

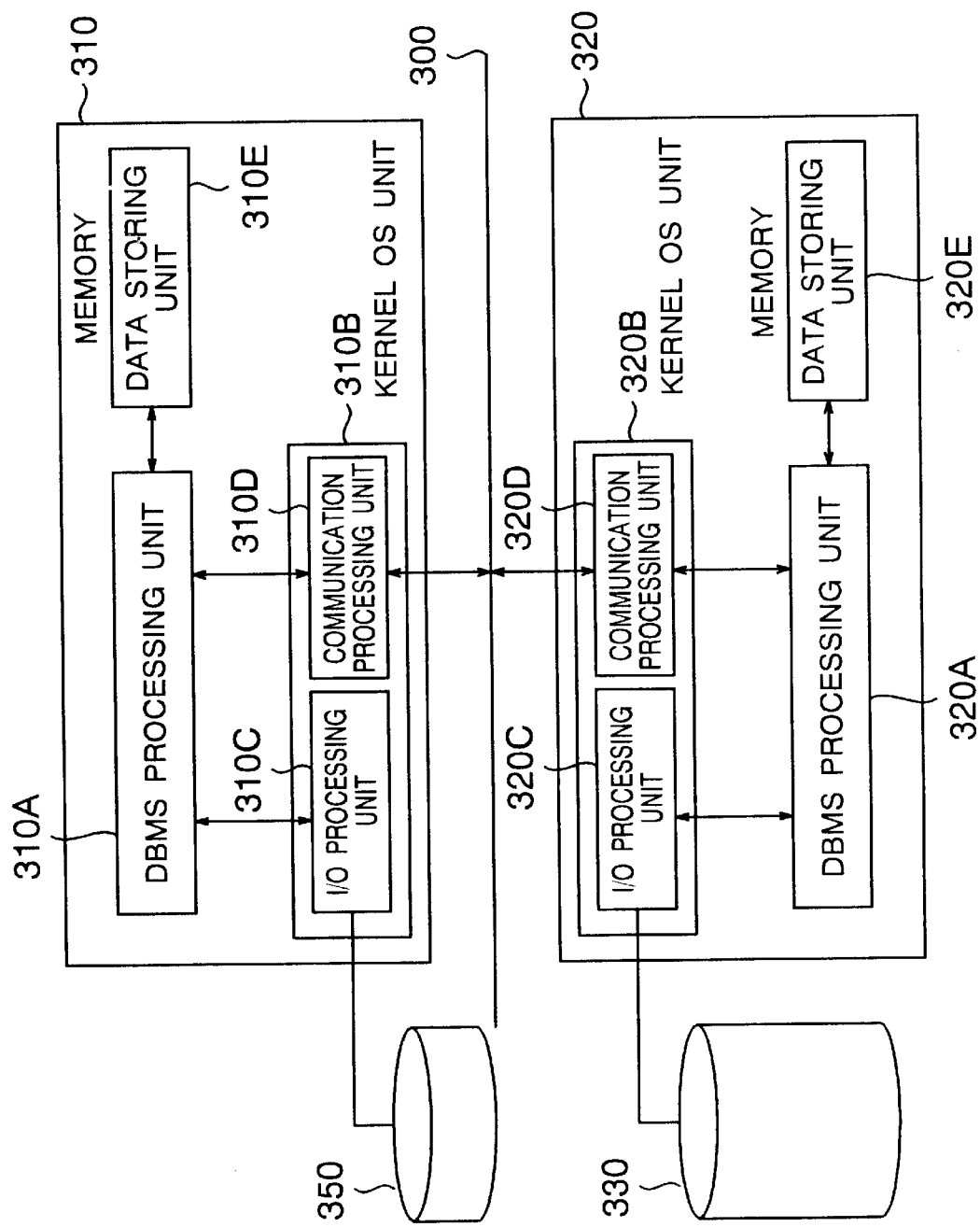

| | INITIALIZATION HANDLE | POINT STORED DATA |
|---|---|---|
| SUBSTITUTION OF VARIABLE<br>LOCATOR = CHARACTER TRAIN (CHARACTER TYPE DATA) | POINT OF DATA BY ONE PERSON | AFTER RELEASE OF AREA IN POINT, POINT STORED DATA |
| | UNDER DATA SHARING | AFTER ACCESS COUNT IN DATA DURING POINTING WAS DECREASED BY 1, NEWLY FORM HANDLE AND SUBSEQUENTLY POINT STORED DATA |
| EXECUTION OF ARITHMETIC OPERATION<br>LOCATOR = CHARACTER TYPE DATA (ARITHMETIC OPERATION) LOCATOR | MEMORY STORAGE IN SELF SERVER | FETCH FROM MEMORY POINTED BY HANDLE |
| LOCATOR FETCHING<br>LOCATOR = LOCATOR (FUNCTION) | FILE STORAGE IN SELF SERVER | FETCH FROM FILE POINTED BY HANDLE |
| CHARACTER TYPE VARIABLE | STORAGE TO OTHER SERVER | REQUEST FETCHING TO SERVER POINTED BY HANDLE |
| SUBSTITUTION OF LOCATOR<br>LOCATOR = LOCATOR | | COUNT UP ACCESS COUNT OF SUBSTITUTION SOURCE HANDLE COPY HANDLE ADDRESS |

FIG. 5B

| UPDATING DESIGNATION SELECTION AND ONE LINE SELECTION | FETCH DATA FROM DB AND STORE INTO SERVER |
|---|---|
| OTHER SELECTION | POINT DB STORED IN DB |

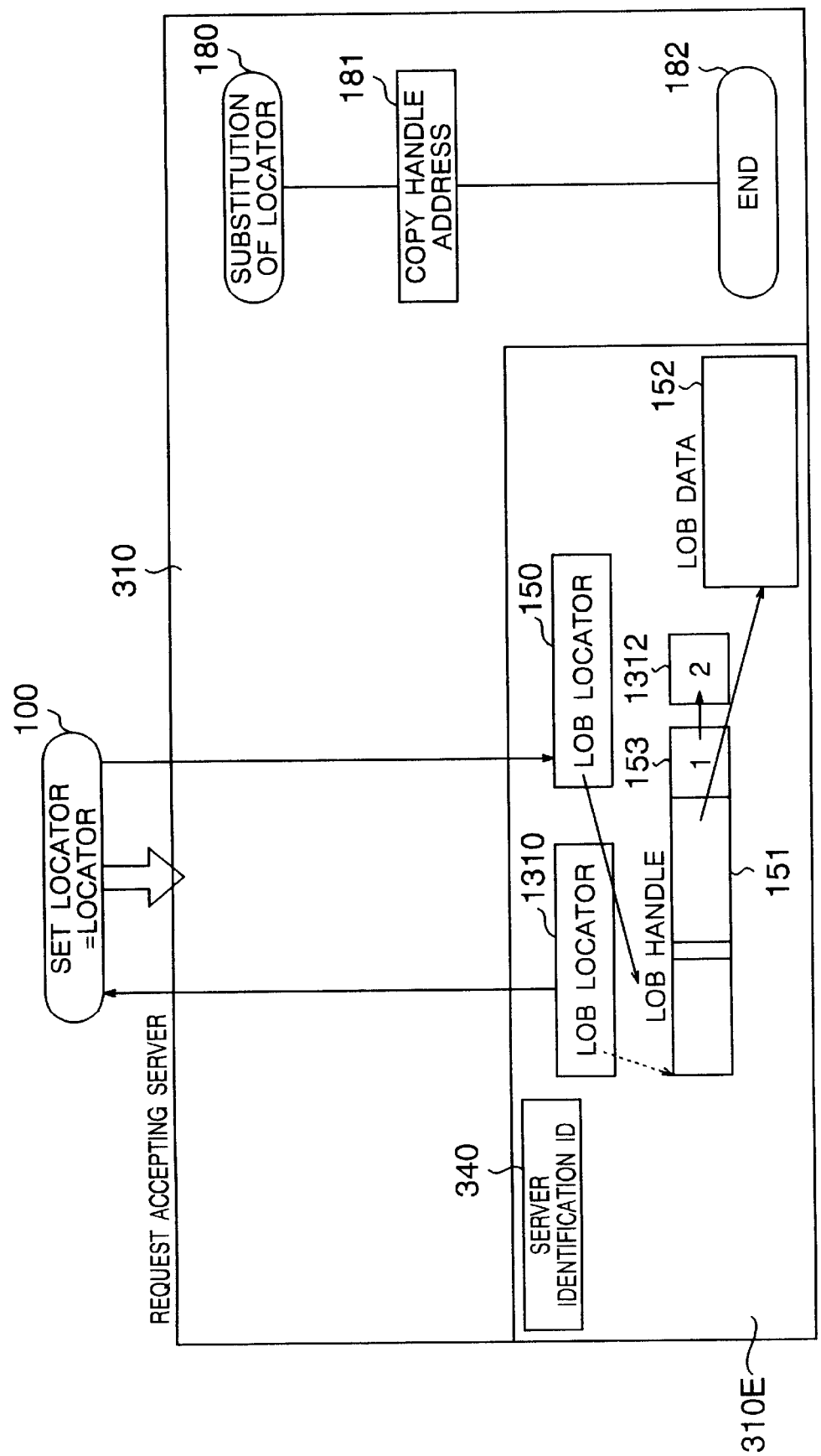

DATABASE PROCESSING METHOD AND APPARATUS USING HANDLE

BACKGROUND OF THE INVENTION

The invention relates to database processing method and apparatus and, more particularly, to database processing method and apparatus which can define a Large Object data type (LOB type) and an Abstract Data Type (ADT type).

A database management system (hereinbelow, abbreviated to DBMS), particularly, a relational DBMS processes an inquiry expressed by a non-procedure like language. SQL is used as a database language. With respect to the database language SQL, studies regarding the standard of the next SQL (ISO, ANSI) are being progressed at present.

The LOB type is one of main functions of the next SQL. The LOB type is a type which enables the DBMS to handle data such as document, moving picture, audio data, or the like of an amount that is extremely larger than that of data which has hitherto been handled by a conventional database. In accordance with a type of data to be stored, a CLOB type for storing character data such as characters or the like and a BLOB type for storing binary data such as image, audio, or the like are prepared.

As for data such as moving picture, audio, or the like, since a size of each data is large, data of a few megabytes or gigabytes is also considered. It is difficult for the user to store or read out data of the LOB type to/from the DBMS in a lump. Therefore, an interface to divisionally write or read out data by a plurality of operations is generally used.

An example of the operation for such LOB data is shown below. An LOB locator is used in order to hold the LOB data as variables in the DBMS and to operate the LOB data by an UAP (user application). Operation examples are shown by a description by a C language. A sentence structure which begins with "EXEC SQL" buried in the C language program is a description of the DBMS operation.

```
EXEC SQL BEGIN DECLARE SECTION;
    SQL TYPE IS BLOB_LOCATOR resume;
    char buffer[1000]=" ";
    int number;
    int start;
    int end;
EXEC SQL END   DECLARE SECTION;
```

In the above description, variables defined within a range from "SQL BEGIN DECLARE SECTION" to "END DECLARE SECTION" denote a definition of the variables which are used for the DB operation. "resume" denotes the LOB locator.

```
EXEC SQL DECLARE c1 CURSOR FOR
    SELECT no , resume FROM emp_resume WHERE
    format='ascii';
EXEC SQL OPEN c1;
EXEC SQL FETCH c1 INTO :number , :resume;
```

It denotes a description indicating that a retrieval for obtaining values of "no" and "resume" in the line of "format='ascii'" in an "emp_resume" table is executed. It is assumed that the "emp_resume" table has previously been defined. First, a cursor "c1" is defined by "DECLARE CURSOR" and the retrieving condition is designated by "SELECT". The cursor "c1" is opened by next "OPEN" and one line adapted to the above condition is extracted by next "FETCH". Now assuming that the "resume" column is of the LOB type, a locator value indicative of the LOB data is set to ":resume".

EXEC SQL SET :buffer=SUBSTR(:resume , :start , :size);

It is a description indicating that a SUBSTR function is executed to the LOB data indicated by the ":resume" locator and the result is stored into a "buffer". The SUBSTR function is a process for extracting data within a range from a ":start" position to a ":size" size of the LOB data shown by the ":resume" locator.

EXEC SQL SET :resume="Hello !!";

It is a description indicating that "Hello!!" is set to the LOB data shown by the ":resume" locator (namely, data is substituted into variables).

EXEC SQL INSERT into emp_resume values(:number, :resume);

It is a description indicating that an integer value of ":number" and the LOB data shown by the ":resume" locator are stored into the "emp_resume" table (namely, an insertion of data into an actual database).

As for the LOB data, the operation as mentioned above can be performed.

ADT (Abstract Data Type) is also one of the main functions of the next SQL. ADT is a data type of a user definition in which a type defined by the user can be designated when a table is defined in a manner similar to a type of a system definition. Since the ADT type is a data type formed by the user and is a data type which is not known by the DB, it is difficult to extract the ADT type data by the UAP such as a C language. For this purpose, an operating method using an ADT locator is provided. In a manner similar to the case of the LOB type, an example of the operation for the ADT type data is shown below.

```
EXEC SQL CREATE VALUE TYPE real_estate
    (rooms              INTEGER,
    size                DECIMAL(8,2),
    text_description    VARCHAR(1024),
    location            address,
    document            doc);
```

It is a description indicating that a "real_estate" type of the user definition is defined.

```
EXEC SQL CREATE VALUE TYPE address
    (street             CHAR(30),
    city                CHAR(20),
    state               CHAR(2),
    zip                 INTEGER);
EXEC SQL CREATE VALUE TYPE doc
    (format             CHAR(20),
    data                BLOB(10M));
```

It is a description indicating that an "address" type and a "doc" type are defined in a manner similar to the definition of the "real_estate" type.

```
EXEC SQL CREATE TABLE real_estate_info
    (price              INTEGER,
    owner               CHAR(40),
    property            real_estate);
```

It is a description indicating that a "real-estate info" table is defined. Particularly, a column of "proper" in the table is set to the "real_estate" type of the user definition.

```
EXEC SQL BEGIN DECLARE SECTION
SQL TYPE IS ADT_LOCATOR FOR real_estate re_locator;
SQL TYPE IS BLOB(2G) doc_file;
struct{
    short      len;
    char       data[1024];
}text_descr;
EXEC SQL END DECLARE SECTION;
```

Variables defined within a range from "SQL BEGIN DECLARE SECTION" to "END DECLARE SECTION" in the above description denote a definition of the variables which is used for the DB operation. "re_locator" indicates the ADT locator.

```
EXEC SQL DECLARE rel CURSOR FOR
    SELECT property FROM real_estate_info
        WHERE price<400000 FOR UPDATE OF
        property;
EXEC SQL OPEN rel;
```

In the above description, a cursor "re1" is defined by "DECLARE CURSOR" and a retrieving condition is designated by "SELECT". A retrieving condition is a retrieval for obtaining "property" in the line of "price<400000" of the "real_estate_info" table in order to update "property". After that, the cursor "re1" is opened by "OPEN".

```
while( SQLCODE==0){
    EXEC SQL FETCH rel INTQ :re_locator;
    EXEC SQL SET    :text_descr =
                    text_description(:re_locator);
    EXEC SQL SET    :doc_file =
                    data(document(:re_locator));
    EXEC SQL UPDATE real_estate_info
        SET property = :re_locator WHERE CURRENT OF
                    rel;
}
EXEC SQL CLOSE rel;
```

The operation which is executed in the above "while" sentence will now be sequentially explained. First, one line is extracted by the cursor "re1" by "FETCH". It denotes that the setting of the current position and the positioning of the ADT locator (a locator value indicative of the ADT data is set to ":re_locator") are performed. The next "SET" sentence indicates that the operation to designate ":re-locator" as an ADT locator and to extract "text_description" of a variable length character train from "property" as a "real_estate" type of the user definition is performed. The next "SET" sentence denotes that the operation to designate ":re_locator" as an ADT locator, to extract "document" as a "doc" type from "property" as a "real_estate" type of the user definition, to extract BLOB data "data" in the "doc" type data, and to transfer it to a client is executed. The next "UPDATE" indicates the execution of the operation to reflect the value of the ADT data designated by the ADT locator "re_locator" to the DB ("real_estate_info" table). After the "while" sentence, the cursor "re1" is closed by "CLOSE".

The following operation can be executed with respect to the ADT data.

The locator has been disclosed in Don Chamberlin, "Using The New DB2", pp. 236–241, 1996.

On the other hand, in recent years, the application of the relational DBMS has been being progressed mainly with respect to a data process of business affairs, so that a database system which can scalably cope with increases in transaction amount and database amount exceeding a progress of a performance of a CPU or a disk capacity has been strongly required. In response to the request, a parallel DBMS has been proposed by various companies. With respect to a parallel DBMS architecture, for example, there have been proposed three systems as described in FIG. 1 of the article disclosed in "Nikkei Electronics", pages 101 to 114, Feb. 27, 1995. The three systems are a Shared-Everything system in which a main storage and a hard disk drive (HDD) are shared by all processors, a Shared-Disk system in which only the HDD is shared among the processors and the main storage is provided for every processor, and a Shared-Nothing system in which none of the main storage and the HDD is not shared among the processors.

In the parallel DBMS, servers are connected by a network and all of a notification of a control, a movement of data, and the like are performed by communication. Therefore, the movement of data of a large size such as LOB data causes an increase in communication load, so that a load of the whole system is raised.

SUMMARY OF THE INVENTION

Although LOB data or ADT data can be stored or read out to/from a DBMS by the foregoing conventional technique, such processes correspond to instructions of the operation between the user application program (UAP) and the DBMS.

In case of processing data of the LOB type in a parallel DBMS, a transfer of LOB data among servers occurs. For example, a parallel DBMS having a construction as shown in FIG. 2 is considered. In this case, an inquiry request from the user is accepted by a request accepting server and an actual execution for the inquiry is performed by a DB processing server. Considering a case of handling the LOB data, for example, the following operations in (1) and (2) are performed.

(1) The LOB data that is sent from the user is transmitted to the DB processing server via the request accepting server.

(2) In case of extracting the LOB data in the DB, the LOB data is transferred from the DB processing server in which the LOB data has been stored to the request accepting server and is further returned to the user.

The movement of the data of a large size such as LOB data among the servers, however, causes an inconvenience that a load of the whole system is raised as mentioned above. On the other hand, even when a retrieval is designated, all of the retrieval results are not always extracted. A case where the retrieval result is directly used as an insertion value to the other table is also considered. In this case, it is efficient that the LOB data is transmitted from a storage source to the DB processing server as an insertion destination without being transmitted via the request accepting server.

There is a handle as a pointer indicative of an object. It is known that storage destination information of management target data such as LOB data or the like is managed by the handle. The "handle" has been disclosed in, for example, Robert B. Murray, "C++ Strategies and Tactics", published by Soft Bank Co. Ltd., pp. 57–73, Jan. 30, 1994. In this case, however, the handle is used by only one computer and the storage destination of data is not managed among a plurality of computers by using the handle. The use of the handle in the database system is not proposed yet.

It is an object of the invention to provide database processing method and apparatus in which when data of a predetermined type is operated in a parallel DB system, a communication load of the whole system is reduced.

Another object of the invention is to provide database processing method and apparatus in which when data of a predetermined type is operated in a parallel DB system, a movement amount and the number of moving times of real data are reduced and an unnecessary data transfer is avoided, thereby reducing a communication load of the whole system.

To accomplish the above object, according to one aspect of the invention, there is provided with a database processing method in a parallel database system which has request accepting servers for accepting a processing request of data of a predetermined type and analyzing the request and allocating a process corresponding to the request to any one of the request accepting servers and at least one of database processing servers and the at least one database processing server for executing the process allocated by the request accepting servers, and in which the request accepting servers and the at least one database processing server are mutually connected through a network, comprising the steps of:

a) preparing a handle (FIG. 4) serving as a control block for managing a storage area of data as a processing target;

b) when the data as a processing target corresponding to the processing request is processed in accordance with the processing request, receiving and transmitting the handle regarding the processing target data corresponding to the processing request between the request accepting server and the database processing server to which the above process was allocated and executing a process according to the processing request; and c) obtaining an entity of the processing target data on the basis of the handle when the entity of the processing target data is necessary in the step b) and processing.

According to another aspect of the invention, there is provided with a database processing method in a parallel database system which has request accepting servers for accepting a processing request of data of a predetermined type and analyzing the request and allocating a process corresponding to the request to any one of the request accepting servers and the at least of database processing servers and the at least one database processing server for executing the process allocated by the request accepting servers, and in which the request accepting servers and the at least one database processing server are mutually connected through a network, comprising the steps of:

a) preparing a server which is a control block for managing a storage area of data as a processing target and in which the data as a processing target has been stored and a handle having information with respect to a storing location;

b) when the data as a processing target corresponding to the processing request is processed in accordance with the processing request, executing a process according to the processing request by the request accepting server by using the handle regarding the processing target data; and c) when an entity of the processing target data is necessary in the step b), obtaining the entity of the processing target data on the basis of the handle and processing.

According to an example of the invention:

in the step a), as such a handle, a handle having a server identifier to identify the server in which the data as a processing target corresponding to the processing request has been stored and storing position information indicative of a position in the server at which the processing target data has been stored is prepared;

in the step b), the data as a processing target corresponding to the processing request is designated by using a locator which is associated in the processing request and designates the handle as a parameter; and in the step c), when the entity of the processing target data is necessary, the entity of the processing target data which is identified by the server identifier and storing position information of the handle is obtained with reference to the handle that is designated by the locator.

According to an example of the invention:

as a location to store the data of the predetermined type, there are a memory in the server, a temporary file of an external storage device connected to the server, or a database of the external storage device connected to the server; and in the step a), as the storing position information, a handle having a flag indicating in which one of the memory in the server, the temporary file of the external storage device connected to the server, and the database of the external storage device connected to the server the data has been stored and an address in which the data has been stored is prepared.

According to an example of the invention, in the step a), as such a handle, a handle having an area to store an access counter value indicative of the number of references sharing the data as a processing target corresponding to the processing request is further prepared.

In the invention, as mentioned above, the process according to the processing request is executed by using the handle as a control block to manage the storage area of the data as a processing target, namely, the handle having the server identifier to identify the server in which the processing target data corresponding to the processing request has been stored and the storing position information indicative of the position in the server in which the processing target data has been stored. Therefore, in cases other than the case where the entity of the processing target data is necessary, the handle is moved among the servers, and when the entity of the processing target data is necessary, the entity of the processing target data is obtained on the basis of the handle. Therefore, the movement amount and the number of moving times of the entity of the unnecessary data can be reduced and the communication load of the whole parallel database system can be reduced. Particularly, the invention is effective in case of handling data of a large size such as LOB data.

BRIEF DESCRIPTION OF THE DRAWINGS

FIG. 3A is a block diagram showing a constructional example of hardware in the database system of FIG. 2;

FIG. 3B is a diagram showing processing contents of a server for various data processing requests in the database system of FIG. 2 according to an embodiment of the invention;

FIG. 5A is a table showing processes which are designated by an SET sentence;

FIG. 5B is a table showing processes which are designated by an SELECT sentence;

FIG. 16 is a diagram for explaining an example of a locator substituting process in the embodiment of the invention;

DESCRIPTION OF THE PREFERRED EMBODIMENTS

Figure 1:
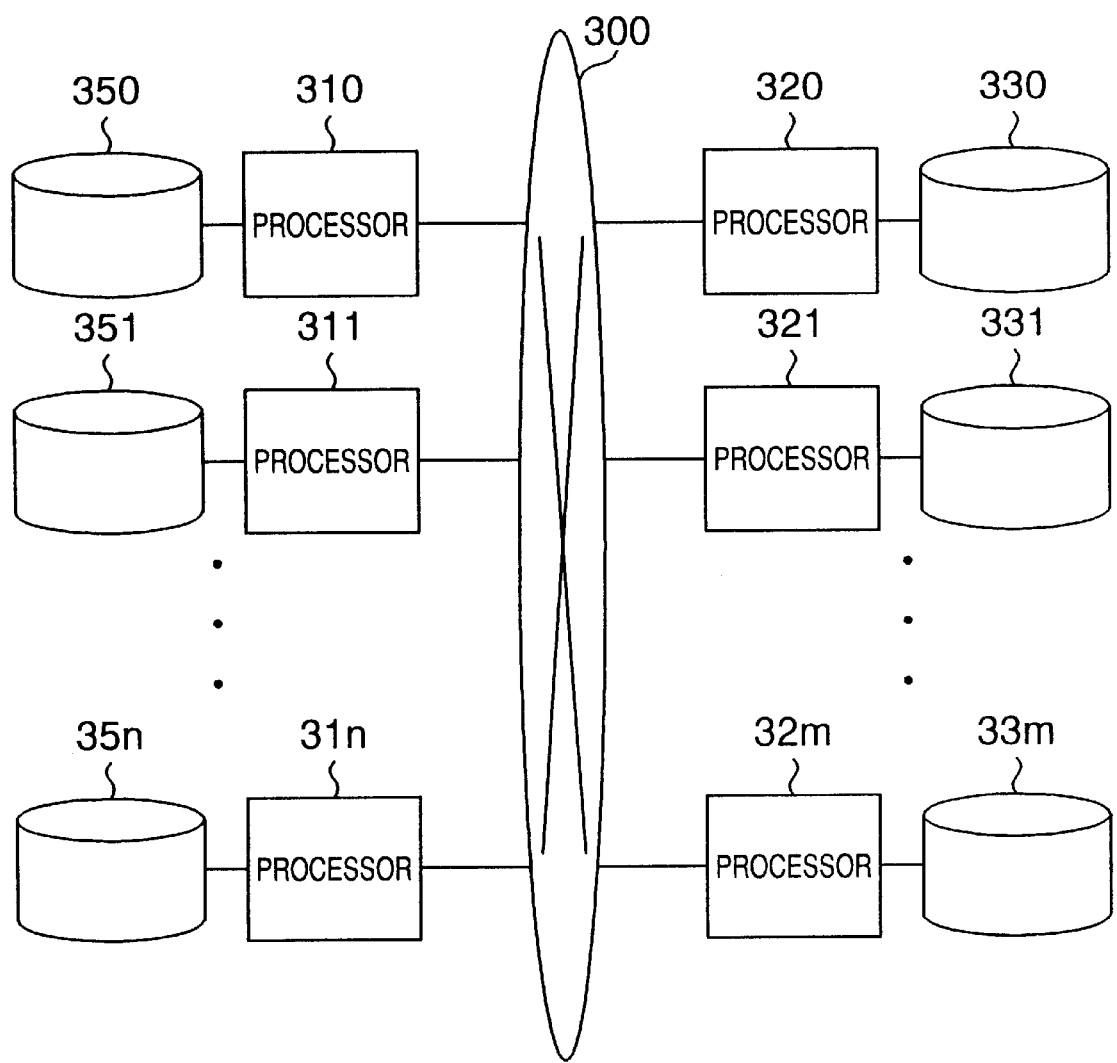
FIG. 1 is a block diagram showing a schematic construction of a database system to which the invention is applied and various processes of LOB type data.
Figure 2:
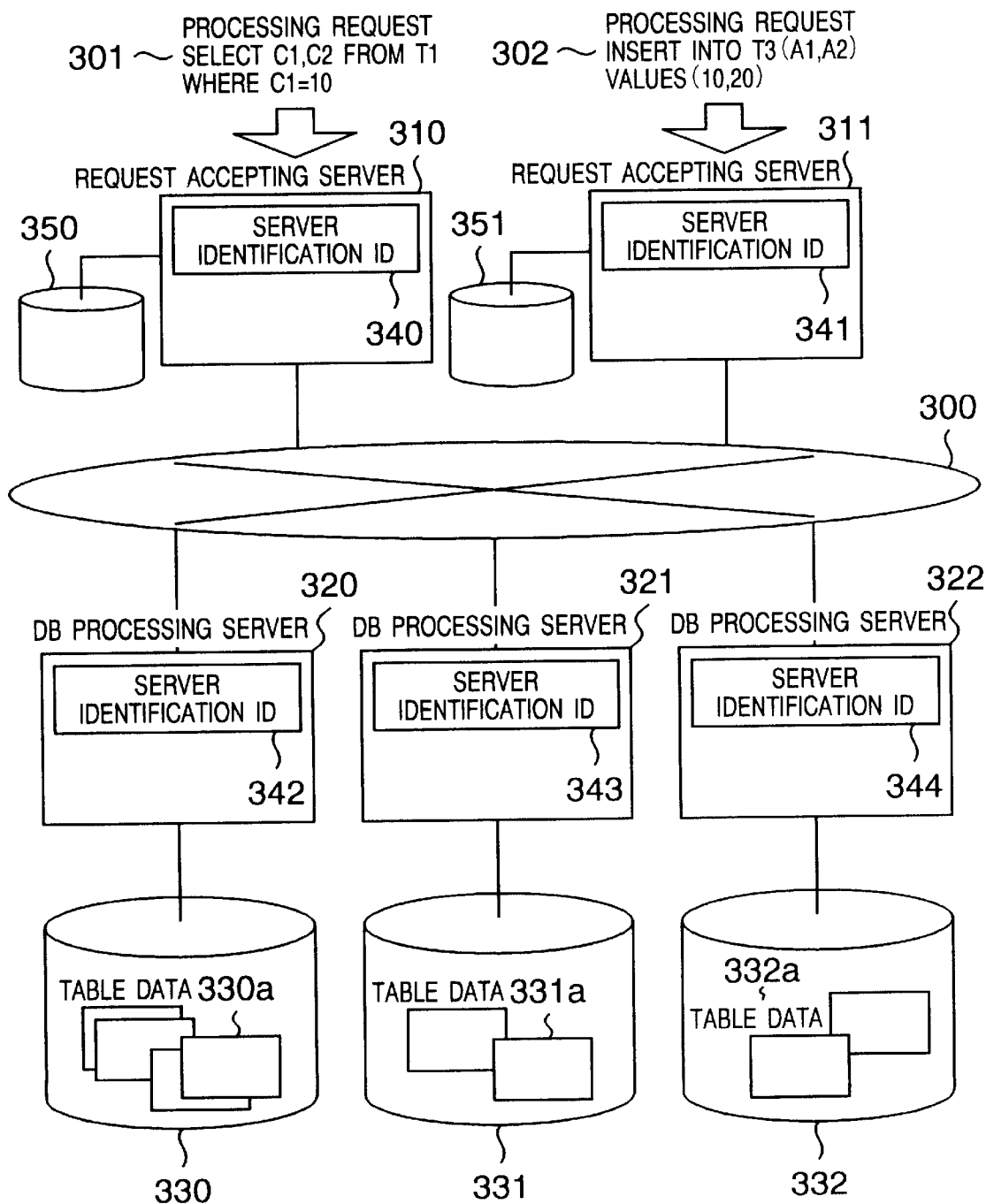
FIG. 2 is a block diagram showing an example of allocation of server functions to processors when the invention is applied to the database system in FIG. 1.
Figure 3B:
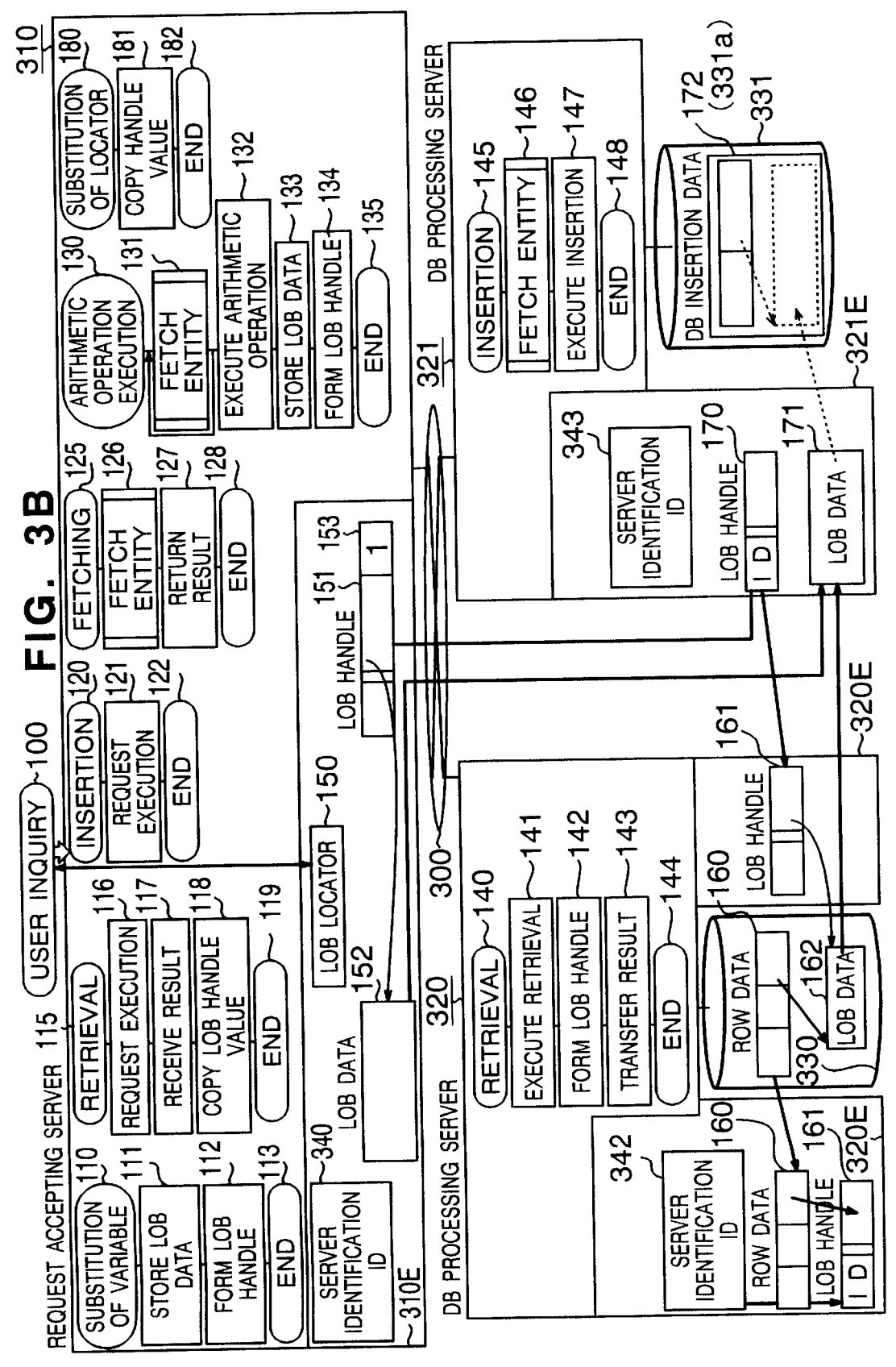

Embodiments of a database system according to the invention will be described in detail hereinbelow with reference to the drawings. FIG. 1 is a block diagram showing a schematic construction of a database system to which the invention is applied. FIG. 2 is a block diagram showing an example of allocating server functions to processors when the invention is applied to the database system of FIG. 1. FIG. 3A is a block diagram showing a constructional example of hardware in the database system of FIG. 2. FIG. 3B is a diagram showing the contents of processes of a server for various data processing requests in the database system of FIG. 2 in an embodiment of the invention.

As shown in FIG. 1, the database system to which the invention is applied is constructed by: n (n≧1) processors 310, 311, . . . , and 31n; m (m≧1) processors 320, 321, . . . , and 32m; and n external storage devices, for example, disk drives 350, 351, . . . , and 35n and m external storage devices, for instance, disk drives 330, 331, . . . , and 33m which are connected to those processors. Nodes each composed of one processor and one disk drive are connected by an interconnection network 300. For example, as shown in FIG. 2, server functions [a request accepting server function and a DB (database) processing server function] are allocated to the processor of each node in FIG. 1. According to the example of FIG. 2, the request accepting server function is allocated to the processors 310, 311, . . . , and 31n and the DB processing server function is allocated to the processors 320, 321, . . . , and 32n. In FIG. 2, for simplicity of explanation, only two request accepting servers 310 and 311 and three DB processing servers 320, 321, and 322 are shown.

The invention can be applied to a database system in which at least one request accepting server and at least one DB processing server are connected via a network. In FIG. 2, the request accepting servers 310 and 311 have functions for receiving processing requests (SQL sentences 301 and 302) from the user, interpreting the received requests, and sending the processing requests via the network 300 to the DB processing servers 320, 321, and 322 corresponding to the requests. In the DB processing servers 320, 321, and 322, table data 330a, 331a, and 332a has been stored in disks in the own disk drives 330, 331, and 332, respectively, and input and output processes of the table data are executed in accordance with execution requests from the request receiving servers. Identifiers (IDs) 340, 341, 342, 343, and 344 for identifying the self servers (that is, server identification IDs) have been allocated to the servers 310, 311, 320, 321, and 322 and stored in built-in memories, respectively.

FIG. 3A shows a constructional example of the request accepting server and the DB processing server. Although FIG. 3A shows the constructions of the servers 310 and 320 as representative examples among the servers in FIGS. 1 and 2, the other servers also have similar constructions. The request accepting server 310 and DB processing server 320 have DBMS (database management system) processing units 310A and 320A, kernel OS units 310B and 320B, and data storing units 310E and 320E serving as memories, respectively. The kernel OS units 310B and 320B have I/O (input/output) processing units 310C and 320C and communication processing units 310D and 320D, respectively. External storage devices, for example, the disk drives 350 and 330 are connected to the I/O processing units 310C and 320C, respectively.

In the request accepting server 310, the I/O processing unit 310C reads and writes data from/to the disk in the self disk drive 350. The communication processing unit 310D accepts the processing request of data of the database from the user that is sent via the network 300 and transfers it to the DBMS processing unit 310A. The DBMS processing unit 310A executes a process according to the contents of the processing request and transfers the processing result to the user via the communication processing unit 310D and the network. In this case, depending on the kind of the processing request, the DBMS processing unit 310A transfers an execution request or the like corresponding to the processing request from the communication processing unit 310D to the corresponding DB processing server via the network. The DB processing server which received the execution request or the like executes a process according to the execution request or the like. When the result of the process executed by the DB processing server in accordance with the execution request or the like is transferred to the request accepting server 310 via the network, the processing request is sent to the DBMS processing unit 310A via the communication processing unit 310D. The DBMS processing unit 310A executes the process corresponding to the processing request and, according to a case, transfers the processing result necessary for the user via the communication processing unit 310D and the network.

In the DB processing server 320, the communication processing unit 320D receives the execution request or the like transferred from the request accepting server 310 via the network and transfers it to the DBMS processing unit 320A. The DBMS processing unit 320A executes a process according to the contents of the transferred execution request or the like, reads and writes the data from/to the disk in the self disk drive 330 via the I/O processing unit 320C in accordance with the kind of execution request, and receives the result via the I/O processing unit 320C. The DBMS processing unit 320A transfers the processing result to the request accepting server 310 via the communication processing unit 320D and the network in accordance with necessity. When the process according to the contents of the transferred execution request or the like is needed to be processed by another DB processing server, the DBMS processing unit 320A transfers a handle or the like to such another DB processing server via the communication processing unit 320D and the network.

The DBMS processing unit in each server has an ROM in which programs for executing the following various processes have been stored and a CPU for executing the programs.

FIG. 3B shows in detail the contents of processes in the request accepting server 310 and DB processing servers 320 and 321 in FIGS. 2 and 3A. By using FIGS. 3A and 3B, each of functions of the DBMS for LOB data in the database system according to the invention will be described. As operation functions of the LOB data, there are functions such as substitution of data for a variable, selection or retrieval of data, insertion of data, fetching of data to UAP, arithmetic operation of data, locator copy, and the like. Requests of those operations are sent to the request accepting server 310 and the DBMS processes are executed. In the searching and inserting processes, an execution request of the processes is sent from the request accepting server to the DB processing server serving as a processing object and the DB processing server which received the execution request executes the searching and inserting processes. In FIG. 3B, a description will be made on the assumption that the searching process is executed by the DB processing server 320 and the inserting process is executed by the DB processing server 321 as a prerequisite.

I. Substituting process for variable

First, the process for substituting the LOB data for a variable will be described. In FIGS. 3A and 3B, together with an LOB locator value and data (LOB data) to be substituted, a user inquiry 100 is sent to the request accepting server 310 and is sent to the DBMS processing unit 310A via the communication processing unit 310D. In the DBMS processing unit 310A, a variable substituting process (110) is executed. That is, the LOB data to be substituted is first obtained and is stored into the data storing unit 310E in the server (step 111). When the data is stored into the data storing unit, a size of LOB data is checked and a check is made to see whether the data can be stored into the data storing unit or not. If it can be stored, a memory area for storage is assured in the data storing unit 310E and the LOB data is stored there. If the data cannot be stored into the data storing unit 310E, the LOB data is stored into a file in the disk drive 350 via the I/O processing unit 310C.

Figure 4:
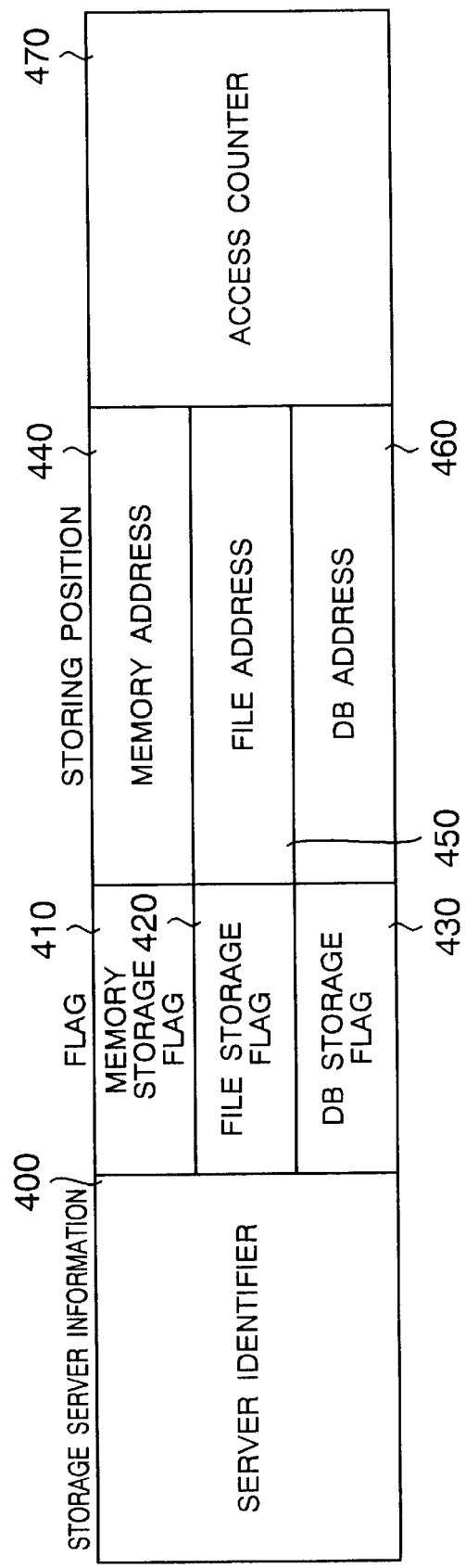
FIG. 4 is a diagram showing a construction of an example of a handle which is used in the embodiment of the invention.

Subsequently, a handle for pointing the stored LOB data is formed (step 112). FIG. 4 shows a constructional example of the handle which is used in the invention. The handle is constructed by: a server identifier 400 as a value for identifying the server in which the LOB data has been stored; flags 410, 420, and 430 serving as storing location information indicative of storing locations (the kind of storing memory) in the server (including the disk drive connected to the server) in which the LOB data has been stored; values 440, 450, and 460 indicative of storing locations of the LOB data; and an access counter 470 indicative of the number of processes which refer to the LOB data at present. With respect to the flags, the memory storage flag 410 is set when the LOB data is stored in a memory (data storing unit) at the time of the LOB data storage and the memory address 440 in which the data has been stored is set. When the LOB data is stored into a file (temporary file) in the disk drive at the time of the LOB data storage, the file storage flag 420 is set and the file address 450 in which the data has been stored is set.

When the LOB data is stored in table data in the disk drive, at the time of the LOB data storage, the DB storage flag 430 is set and the DB address 460 indicative of the storing location in the DB is set.

In a conventional handle, since the data is used only in one server, the server identifier 400 is not provided. Only any one of the set of the flag 410 and storing location 440 for the memory, the set of the flag 420 and storing location 450 for the file, and the set of the flag 430 and storing location 460 for the DB is provided. However, when the data is shared among the servers in the network like the invention, the handle is constructed as shown in FIG. 4.

Figure 7:
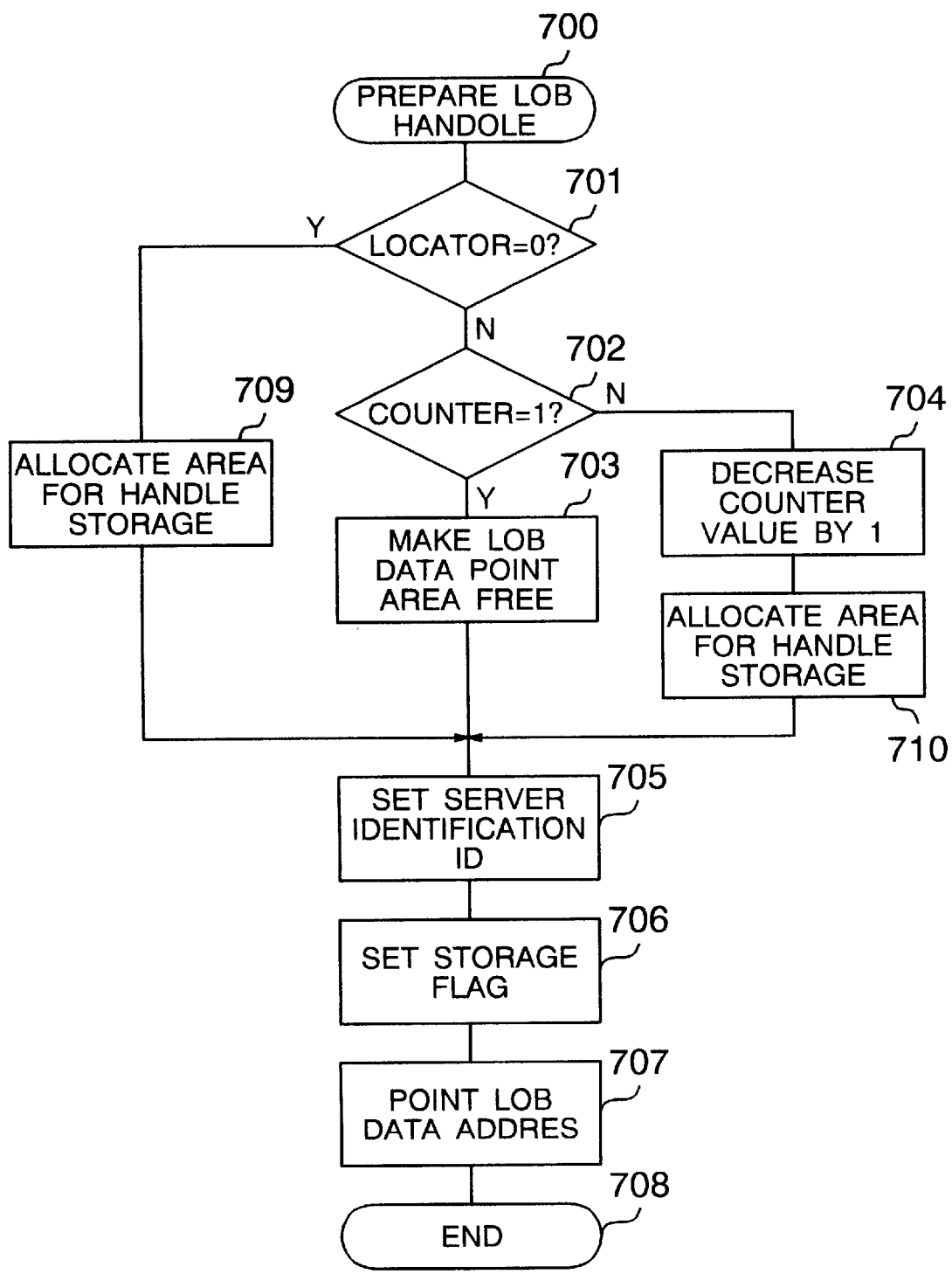
FIG. 7 is a flowchart for explaining an example of a forming process of an LOB handle shown in FIG. 4.

When the substitution of the LOB data for the variable is executed, it can be considered that the handle is in either one of two states: (1) the LOB data is substituted for the variable for the first time; and (2) the LOB data is substituted for the variable to which the substitution was executed more than once. Further, in case of (2), two states can be considered: a state where the LOB data which is being pointed now is used by one person; and a state where the LOB data which is being pointed now is shared by two or more persons. A process for forming the LOB handle will now be divisionally described hereinbelow with respect to the above three cases with reference to a flowchart of FIG. 7 and schematic diagrams of the substituting process of FIGS. 8 and 9. FIG. 7 is the detailed flowchart of step 112 in FIG. 3B for forming the LOB handle.

Figure 8:
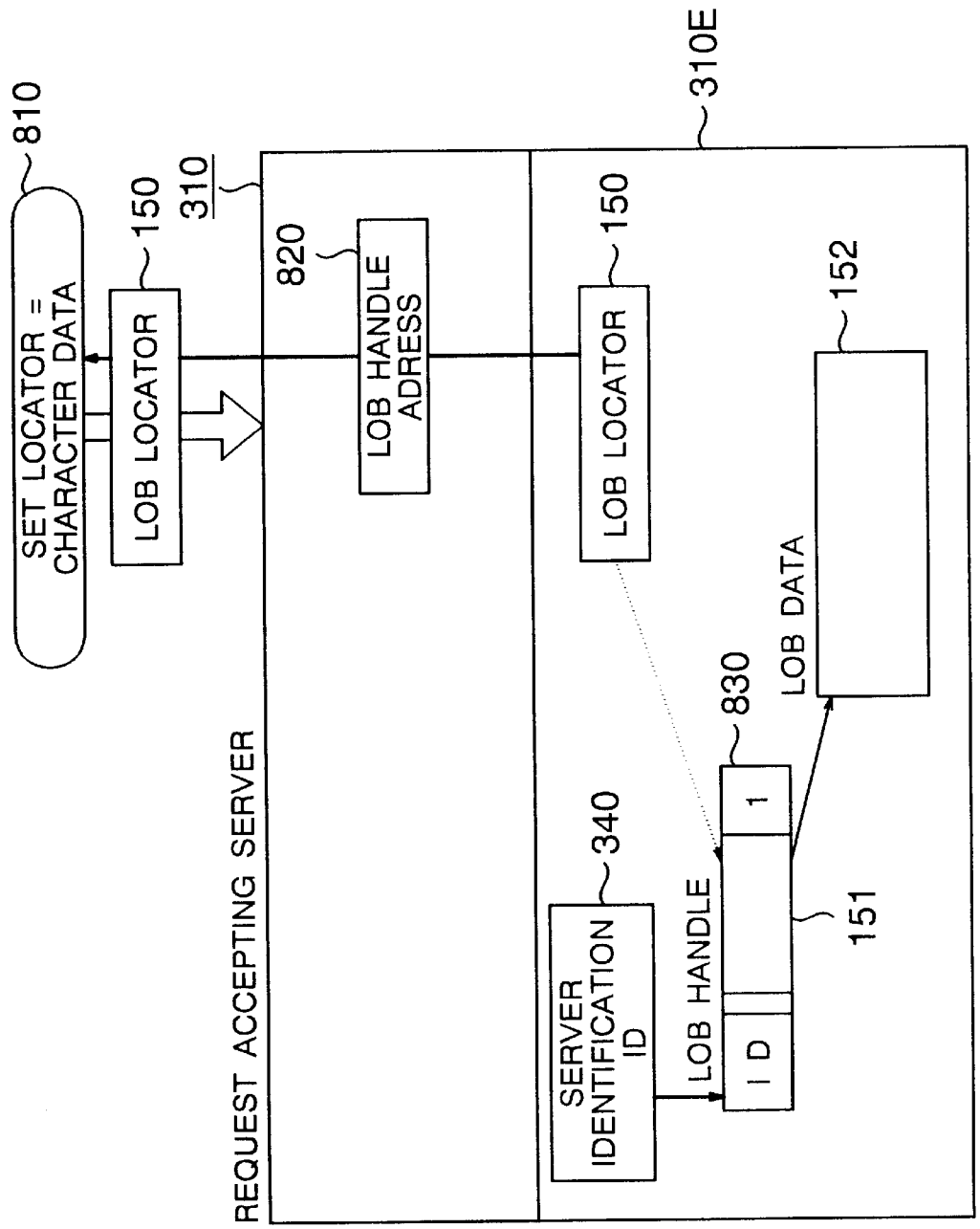
FIG. 8 is a diagram for explaining an example of a process for substituting LOB data for a variable in a request accepting server in the embodiment of the invention.

The case (1) of substituting the LOB data for the variable for the first time will be described with reference to FIGS. 7 and 8. In this case, since an LOB locator 150 is in an initial state (that is, the locator value is equal to an initial value of "0"), the processing routine advances from step 701 to step 709 and an area (151 in FIG. 8) for storing the LOB handle is allocated in the data storing unit 310E. After that, the server identification ID 340 is set to the server identifier 400 of the LOB handle 151 (step 705). A storage flag and a storing position of the LOB handle 151 are set, and a value of the access counter 470 is set to, for example, "1" (steps 706 and 707), thereby finishing the LOB handle forming process (that is, formation of the LOB handle corresponding to the LOB data which is substituted) (step 708). Specifically speaking, when LOB data 152 is stored into the memory 310E upon storage of the LOB data 152 to be substituted, the memory storage flag 410 and memory address 440 in which the LOB data has been stored are set. When the LOB data 152 is stored in the file upon storage of the LOB data 152 to be substituted, the file storage flag 420 and file address 450 in which the LOB data has been stored are set.

The value of the access counter 470 in the handle shows the number of persons who share the handle. Therefore, when there is no person who shares the handle as mentioned above, "0" is set. In case of one person, "1" is set. In case of two persons, "2" is set. Other values can be also set according to the persons who share the handle.

Figure 9B:
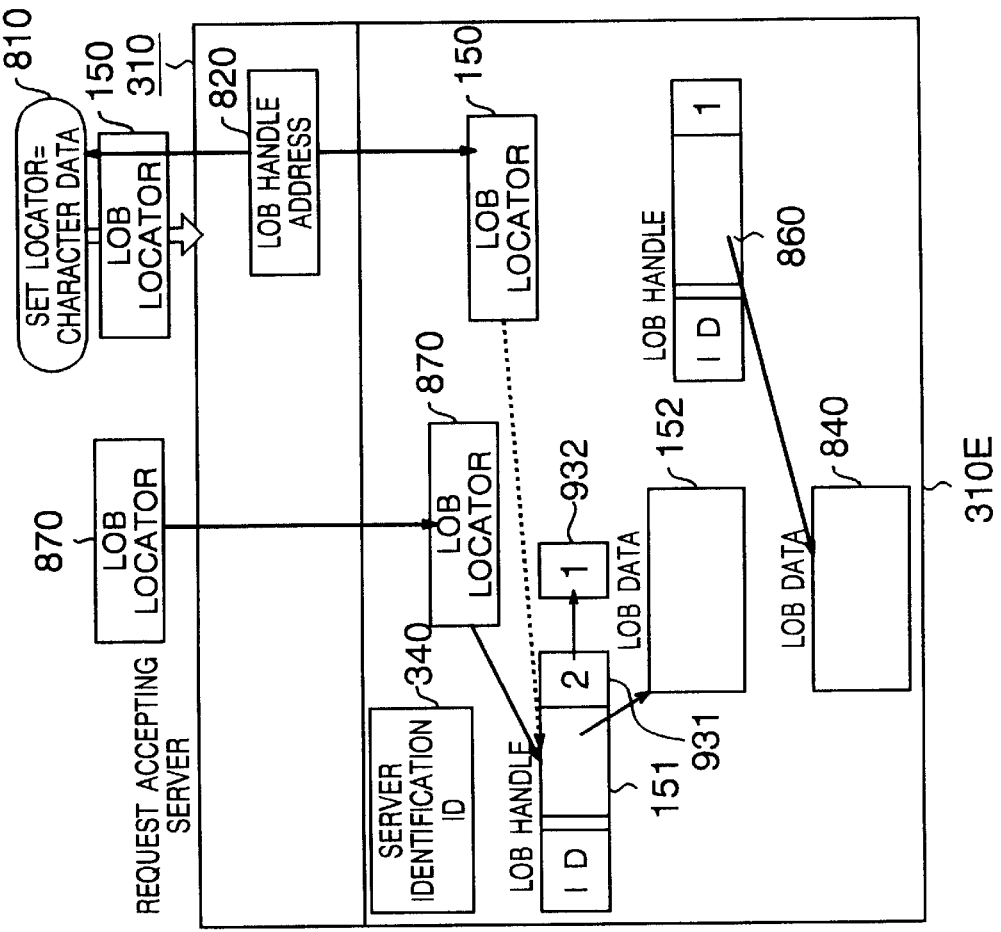
FIG. 9B is a diagram for explaining an example of a process in case of substituting LOB data for a variable in the request accepting server when the LOB data which is pointed is shared in the embodiment of the invention.
Figure 9A:
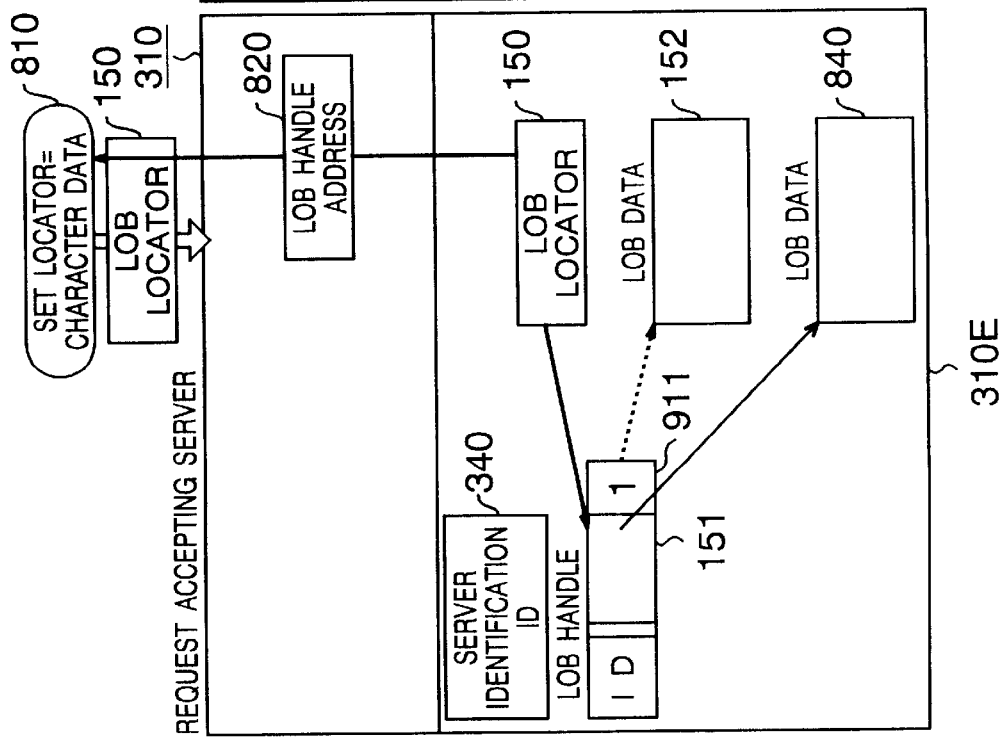
FIG. 9A is a diagram for explaining an example of a process in case of substituting LOB data for a variable in the request accepting server when the LOB data which is pointed is used by one person in the embodiment of the invention.

(2) A case where the LOB data which is pointed at present is used by one person will now be described with reference to FIGS. 7 and 9A. In this case, since the LOB locator 150 is not equal to the initial value "0", the processing routine advances from step 701 to step 702. A check is made to see if a value of an access counter 911 of the LOB handle 151 on the destination side which is at present pointed by the LOB locator 150 is equal to "1" (step 702). Since the system is in a state where the LOB data which is at present pointed by the LOB locator 150 through the LOB handle 151 is used by one person, a value of the access counter 911 is equal to, for instance, "1" as shown in FIG. 9A. Therefore, the processing routine advances from step 702 to step 703 and the area 152 in which the LOB data has been stored is made free (step 703). In a manner similar to steps 705 to 708 in case of the above (1), the server identification ID 340 is set into the servo identifier 400 of the LOB handle 151 (step 705). The storage flag and storing position of the LOB handle 151 are set (steps 706 and 707). The LOB handle forming process (namely, a correction of the contents of the LOB handle in correspondence to the substitution LOB data) is finished (step 708). When LOB data 840 is stored into the memory 310E at the time of storage of the LOB data 840 to be substituted, the memory storage flag 410 and stored memory address 440 are set. When the LOB data 840 is stored into the file at the time of storage of the LOB data 840 to be substituted, the file storage flag 420 and stored file address 450 are set. FIG. 9A shows a case in which the LOB data 840 is substituted in a state in which the LOB locator 150 points the LOB handle 151. In this case, since the value of the access counter 911 is equal to "1", the area of the LOB data 152 so far is made free and the LOB handle 151 points the data 840 newly substituted in place of the LOB data 152.

(3) A case where the shared LOB data is pointed will now be described with reference to FIGS. 7 and 9B. In this case, since the LOB locator 150 is not equal to the initial value "0", the processing routine advances from steps 701 to 702. A check is made to see if a value of an access counter 931 of the LOB handle 151 on the destination side which is at present pointed by the LOB locator 150 is equal to "1" (step 702). Since the system is in a state in which the LOB data which is at present pointed is shared by a plurality of persons, the value of the access counter 931 of the LOB handle 151 is equal to "2" or more (for example, "2") as shown in FIG. 9B. Therefore, the processing routine advances from step 702 to step 704 and the value of the access counter 931 is reduced by "1" and an access counter 932 is set to "1" (step 704). An area 860 to store a new LOB handle is allocated (step 710). In a manner similar to steps 705 to 708 in the case of (1), the server identification ID 340 is set into the server identifier 400 of the LOB handle 860 (step 705). A storage flag and a storing position of the LOB handle 860 are set (steps 706 and 707). The LOB handle forming process (namely, a correction of the LOB handle in correspondence to the new LOB data and a formation of a new LOB handle) is finished (step 708). When the LOB data 840 is stored into the memory 310E at the time of storage of the LOB data 840 to be substituted, the memory storage flag 410 and stored memory address 440 are set. When the LOB data 840 is stored into the file at the time of storage of the LOB data 840 to be substituted, the file storage flag 420 and stored file address 450 are set. In an example of FIG. 9B, the LOB handle 151 which is pointed by the LOB locator 150 is also referred from another LOB locator 870. The value of the access counter 931 of the LOB handle 151 is equal to "2". Therefore, the value of the access counter 931 is decreased by "1" and the access counter 932 is set to "1". Further, the LOB handle 860 for data to be substituted is newly formed. The data 840 to be substituted is pointed by the LOB handle 860.

In any of the above cases (1) to (3), after completion of the formation of the LOB handle corresponding to the new LOB data, an address (820 in FIGS. 8, 9A, and 9B) of the relevant LOB handle is set into the LOB locator 150. The process for substituting for the variable is finished in this manner.

II. Retrieving process

The retrieving (or selection) process will now be described with reference to FIG. 10. The retrieving process is started when a user inquiry 900 is sent to a request accepting server 310 by an SELECT command issued from the UAP. When receiving a retrieving request via the communication processing unit 310D, the DBMS processing unit 310A of the request accepting server 310 transfers a retrieval execution request (C116) to the DB processing server serving as a retrieval target (step 116). Explanation will now be made hereinbelow on the assumption that the execution request was performed to the DB processing server 320. In the diagram, a line shown by a reference numeral added with "C" indicates a flow of a command, data, or the like corresponding to the processing step.

Since information indicating to which table the retrieval is executed is included in the SELECT command, the request accepting server can recognize in which DB processing server the table exists by such information. Thus, the DB processing server as a retrieval target can be recognized.

The DBM processing unit 320A of the DB processing server 320 which received the execution request through the network 300 and communication processing unit 320D executes a retrieving process 140. First, the retrieval instructed by the execution request is executed (step 141) and a retrieval result (C141) is sent to a requesting source. In this instance, when the LOB data is instructed as data to be fetched by the retrieval, an LOB handle 161 is formed (step 142) and its value is transferred (C143) to the DBMS processing unit 310A through the communication processing units 320D and 310D (step 143). The LOB handle 161 is stored into the memory 310E. The processing unit 320A sets the identification ID 342 of the server under execution as a server identifier 400 into the LOB handle 161 and also sets the DB storage flag 430 and storing position 460 in the DB. The initial value "1" is set into the access counter 470.

Figure 6B:
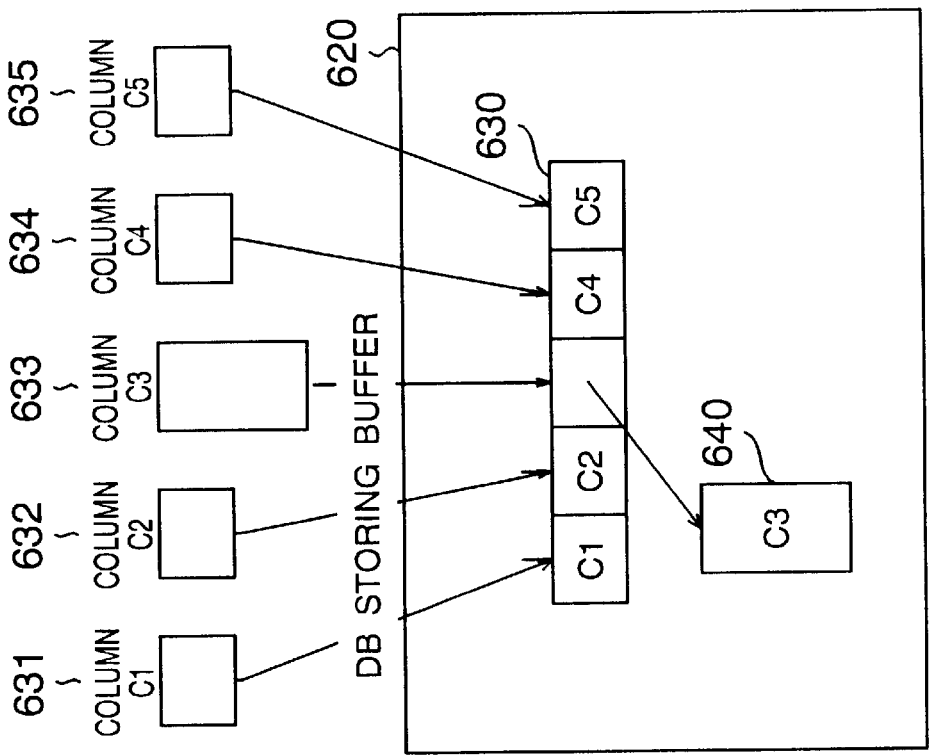
FIGS. 6A and 6B are diagrams for explaining a method of storing data into DB.
Figure 6A:
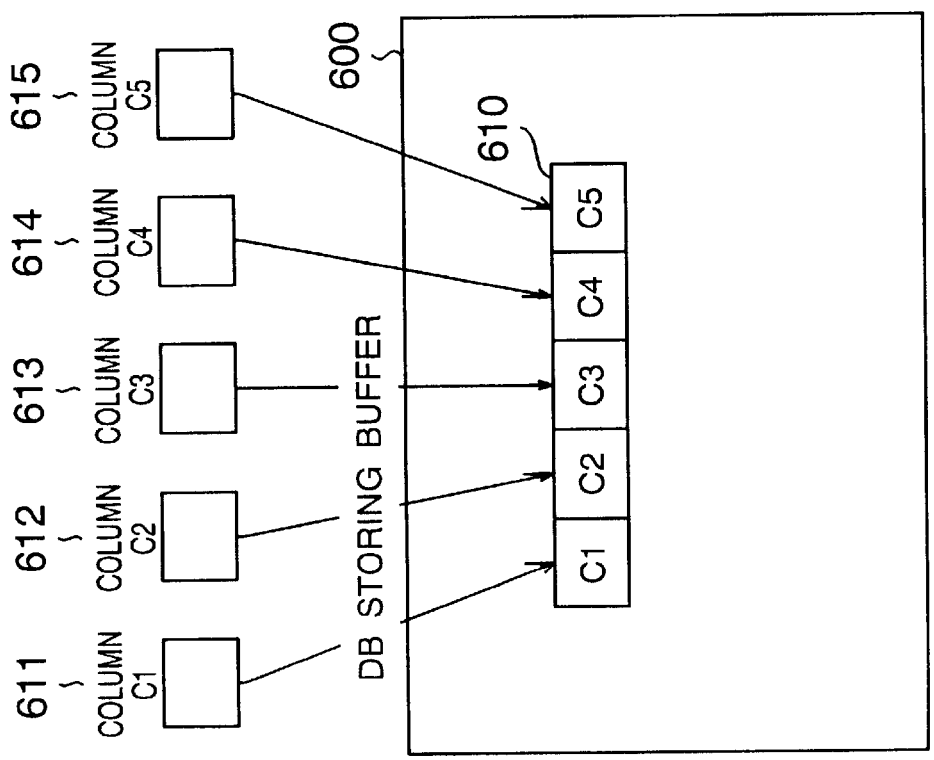

The storage of the retrieval data into the DB of the disk drive will now be described with reference to FIGS. 6A and 6B. In the case where the retrieval data is data of an ordinary table, as shown in FIG. 6A, data 611, 612, 613, 614, and 615 of columns Cl to C5 of one line are combined with respect to an amount of one line and stored into an area 610 of a DB storing buffer (table data in a disk 600 in the disk drive). In the case where the retrieval data is data of a table including LOB data 633, as shown in FIG. 6B, the LOB data 33 of column C3 is not stored into the same position 630 as those of the data 631 to 635 of the other columns Cl, C2, C4, and C5 but is stored into another position 640 in the disk 620. The LOB data storing position is set as data of column C3.

Figure 10:
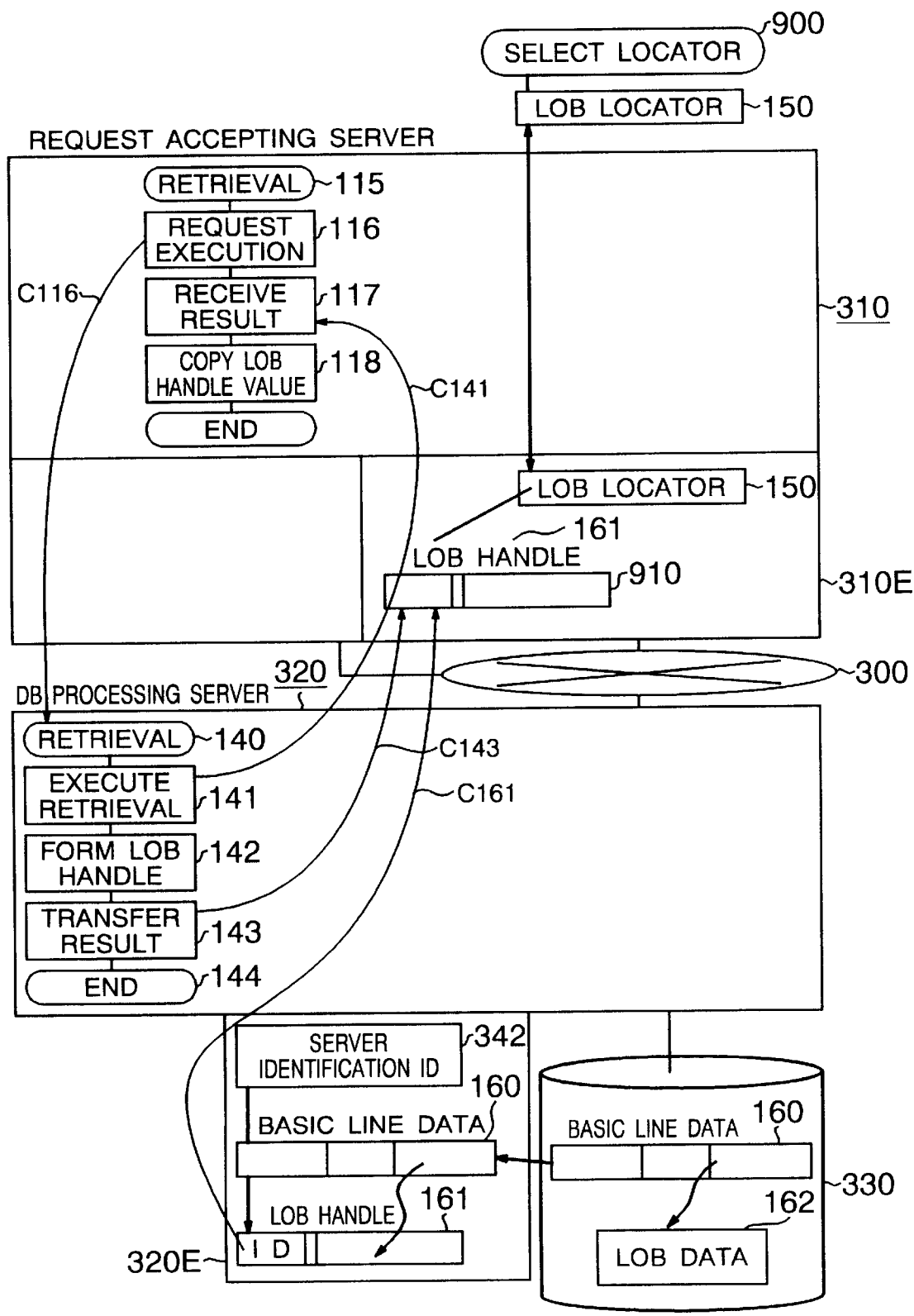
FIG. 10 is a diagram for explaining an example of a retrieving process in the embodiment of the invention.

Returning to the description of the retrieving process of FIG. 10, in the retrieving process by the DBMS processing unit 320A of the DB processing server 320, line data 160 in the table data of the disk in a disk drive 330 is fetched and a value corresponding to the LOB data storing position in the line data 160 is set into the handle 161 (step 142). The handle 161 formed is transferred to the requesting source through the communication processing unit 320D (C161) (step 143).

The DBMS processing unit 310A of the request accepting server 310 receives the retrieval result sent from the DB processing server 320 (step 117). A handle storage area 910 of the handle 161 is assured in the memory 310E and the handle 161 in the received result is set into the handle storage area 910 (step 118). The locator 150 to point the LOB handle 161 formed as mentioned above is sent to the UAP.

Figure 11:
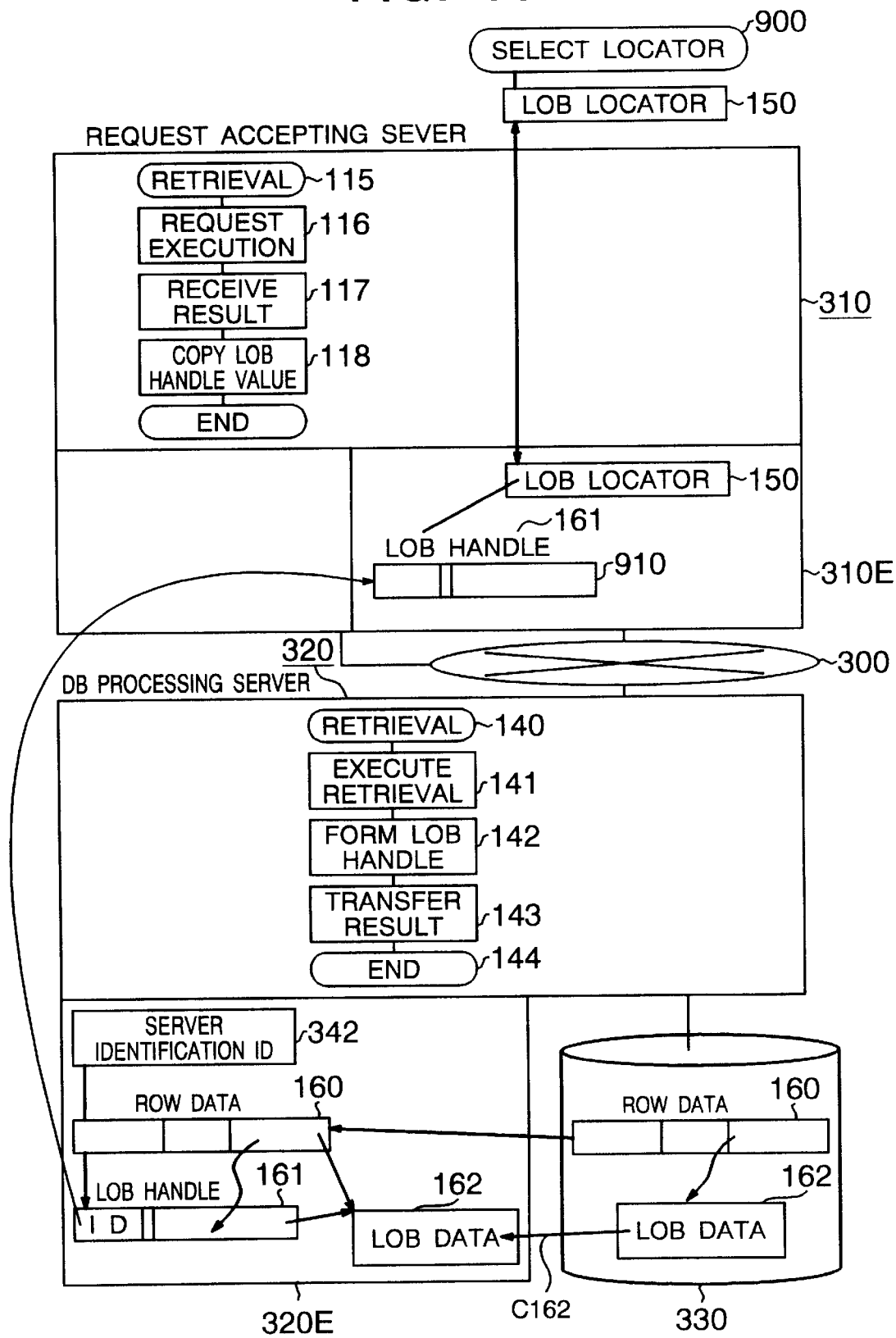
FIG. 11 is a diagram for explaining another example of a retrieving process in the embodiment of the invention.

In the retrieving request of the user, the retrieval by the cursor or the retrieval of one line is designated. In the cursor retrieval, there is an option in which a column to be updated is designated after the retrieval. There is a case where a value of the column in which the updating is designated by the option is changed after the retrieval. On the other hand, even in the retrieval of one line, after the result was obtained, the value can be updated with respect to the obtained line. In the above two cases, after the LOB data storing position in the DB was stored into the LOB handle and the handle was formed like a retrieving process described in FIG. 10, when the value of the column is updated, the data to be pointed by the handle becomes the data after the updating. Therefore, at the time of the LOB data retrieving process with respect to the column designated as a target of the updating by the cursor retrieval or the column designated by the retrieval of one line, the process is executed as shown in FIG. 11 in place of FIG. 10. That is, when the retrieval having a possibility such that the value is changed after the retrieval is designated as mentioned above, at the time of formation of the handle 161, the DBMS processing unit 320A fetches the LOB data 162 from the DB of the disk drive 330 and writes it into the memory 320E or the file of the disk drive 330 (C162). Further, the LOB handle 161 to point the written LOB data 162 is formed. In FIG. 11, the other processes are similar to those in FIG. 10.

After completion of the process as mentioned above, the DBM processing unit 310A of the request accepting server 310 finally sets the address of the LOB handle 161 in the area 910 assured in the memory 310E into the LOB locator 150 and the retrieving process is finished. Thus, even if the data of the DB is changed by the other person at the time of retrieval, the LOB handle can point the correct LOB data.

III. Inserting process

The inserting process will now be described. The inserting process is started by an INSERT command from the UAP. Although the values of the other elements (columns) of a table in the DB are directly designated at the time of insertion, the LOB data is designated by the LOB locator 150 from the UAP. The LOB data which is designated here may be any one of the LOB data 152 of a variable in the DBMS in the memory of the request accepting server and LOB data 162 stored in the DB of the disk drive in the DB processing server. For example, the LOB data substituted for the variable by the substituting process for the variable or the LOB data as a result retrieved by the retrieving process can be designated. A case of inserting the LOB data as a variable in the DBMS into the DB will be first explained hereinbelow. A case of inserting the LOB data stored in the DB into another DB will subsequently been described.

Figure 12:
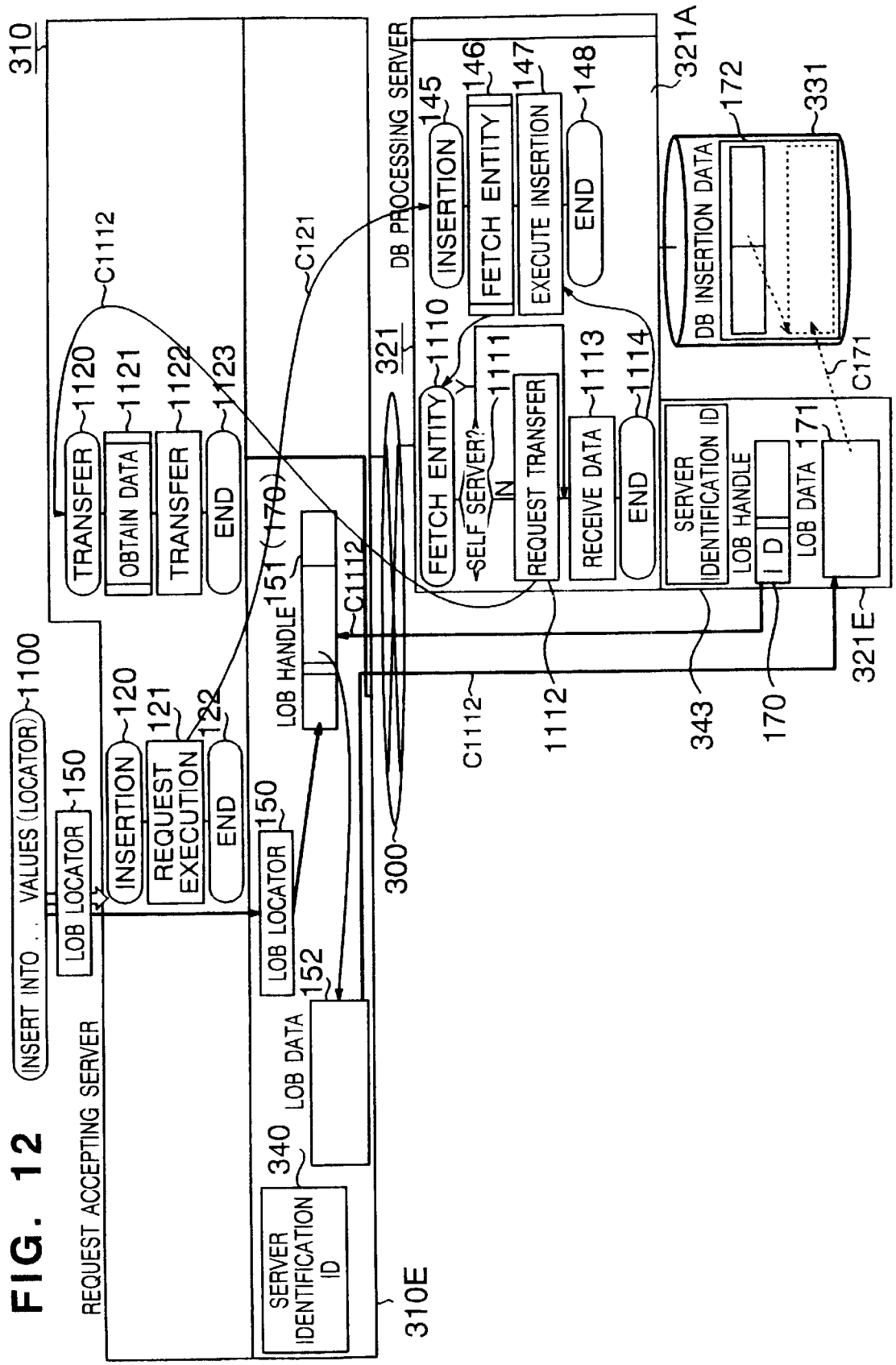
FIG. 12 is a diagram for explaining an example of an inserting process of the LOB data in the embodiment of the invention.

First, a process in the case where an inserting request of the LOB data 152 as a variable in the DBMS is performed by the user will be explained with reference to FIG. 12. When an inserting request 1100 from the user is received, the DBMS processing unit 310A of the request accepting server 310 starts an inserting process 120 and requests the insertion execution to the DB processing server (C121) (step 121). It is now assumed that the execution request is sent to the DB processing server 321. In this instance, an LOB handle 170 is sent as a handle indicative of the insertion data. The handle 170 is the LOB handle 151 indicated by the LOB locator 150 designated by the user at the time of the inserting request. In this case, it is the LOB handle which points the LOB data 152 as a variable.

A DBMS processing unit 321A of the DB processing server 321 which received the execution request executes an inserting process 145. First, an entity fetching process of the LOB data is executed by the received handle 170 (step 146).

The entity fetching process is a process of a flow 1110. First, since the information to identify the server has been set in the handle as mentioned above, the server of the LOB data storing source is identified from the handle 170 (step 1111). When the storing source is the self server 321, the request is not transferred but can be referred as it is. Therefore, the data is directly obtained with reference to the LOB data (step 1113). When the storing source is the other server, a transfer request (C1112) of the entity of the LOB data is sent to the server through the network 300 (step 1112). When requesting the transfer, the handle 170 is added and the transfer is requested (C1112).

When the server of the storing source is the server 310, the transfer request is sent to the request accepting server 310. Then, the DBMS processing unit 310A of the request accepting server 310 executes a transfer process 1120. That is, the entity of the LOB data is fetched on the basis of the handle 170 added to the transfer request (step 1121) and is transferred to the server 321 as a requesting source (step 1122). In the data fetching process in step 1121, in which position the LOB data has been stored is discriminated by the LOB handle 170. In the case where it has been stored in the memory 310E, the LOB data 152 stored at the storing position which is designated by the memory address 440 in the handle 170 is fetched. In the case where the LOB data has been stored in the file of the disk drive 350, the LOB data is extracted from the file designated by the file address (file identifier) in the handle.

The transfer requesting source 321 receives LOB data 171 transferred as mentioned above (step 1113). The entity of the LOB data is extracted in this manner.

After the entity was received, the DB processing server 321 stores those data into the DB of the table data 172 of the disk drive 331 (C171) (step 147). The inserting process is finished.

Figure 13:
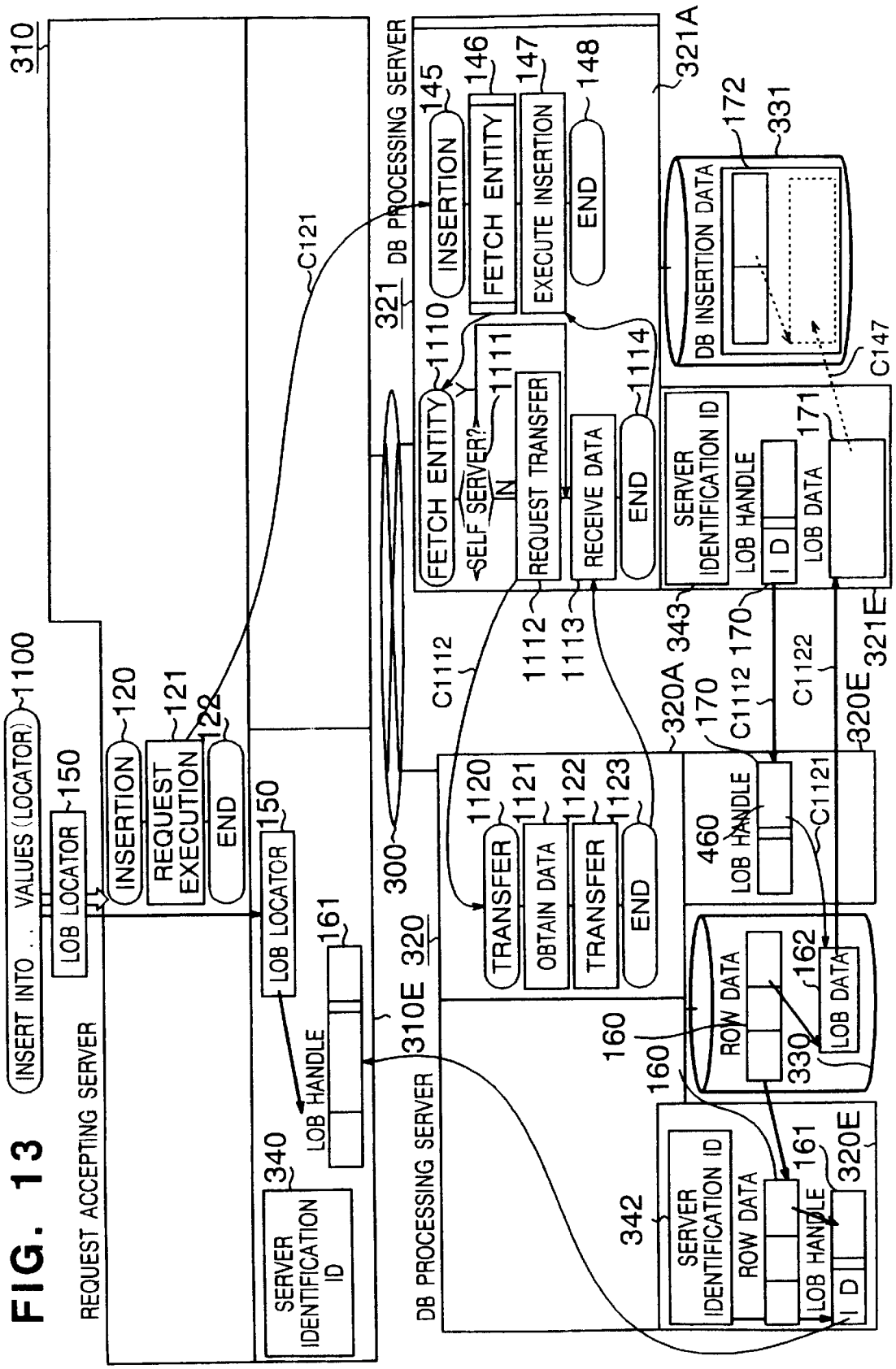
FIG. 13 is a diagram for explaining another example of the inserting process of the LOB data in the embodiment of the invention.

Processes in the case where the insertion of the LOB data 162 stored in the DB is requested by the user will now be described with reference to FIG. 13. The description of the same portions as those in FIG. 12 is omitted. When the inserting request (1100) is received by the user in a manner similar to FIG. 12, the DBMS processing unit 310A of the request accepting server 310 starts an inserting process 120 and sends an insertion execution request (C121) and handle 170 to the relevant DB processing server, for example, server 321 (step 121). The DBMS processing unit 321E of the DB processing server 321 which received the execution request executes the inserting process 145. First, the process for fetching the entity of the LOB data is executed from the received handle 170 (step 146). Although the entity fetching process 1110 is as described in FIG. 12, it is now assumed that the LOB data to be fetched exists in the DB of the other DB processing server, for example, server 320. In this case, in the entity fetching process 1110, the DBMS processing unit of the DB processing server 321 adds the handle 170 to a transfer request (C1112) of the entity of the LOB data and sends the resultant transfer request to the DB processing server 320 through the network 300.

The DBMS processing unit 320A of the DB processing server 320 which received the transfer request executes the transferring process 1120. In the transferring process 1120, on the basis of the transferred LOB handle 170, at which position the LOB data has been stored is discriminated. The entity of the LOB data is fetched (C1121) (step 1121) and is transferred to the requesting source (C1122) (step 1122). It is now assumed that the LOB data to be obtained is the LOB data 162 stored in the DB of the disk drive 330 and the DB storage flag 430 and DB address 460 have been set in the handle 170. In the obtaining process of the entity of the LOB data (step 1121), the LOB data 162 is fetched from the DB on the basis of the DB address 460 of the handle 170. The fetched LOB data 162 is transferred to the DB processing server 321 as a requesting source through the network 300 (step 1122). The DB processing server 321 on the transfer requesting source side receives the transferred result 171 (step 1113). The entity of the LOB data is fetched in this manner. After the entity was received, the data 171 is stored into the DB of the disk drive 331 (C147) (step 147). The processing routine is finished.

The inserting process is finished in this manner.

IV. Fetching process

The fetching process of the LOB data to the UAP will now be described with reference to FIGS. 14 and 15. In a manner similar to the inserting process, the fetching of the LOB data is instructed by the LOB locator 150 corresponding to the LOB data. The DBMS processing unit 310E of the request accepting server 310 which accepted the request executes a fetching process 125. First, the fetching process of the entity of the LOB data is executed from the handle 151 shown by the LOB locator 150 (step 126). The entity fetching process 1110 is a process similar to the entity fetching process 1110 executed by the DB processing server at the time of the inserting process described in FIGS. 12 and 13. Processers will now be described divisionally with respect to a case where the handle 151 is a handle indicative of the LOB data 152 of the variable in the DBMS in the memory of the request accepting server and a case where it is a handle indicative of the LOB data 162 stored in the DB of the disk drive of the DB processing server.

Figure 14:
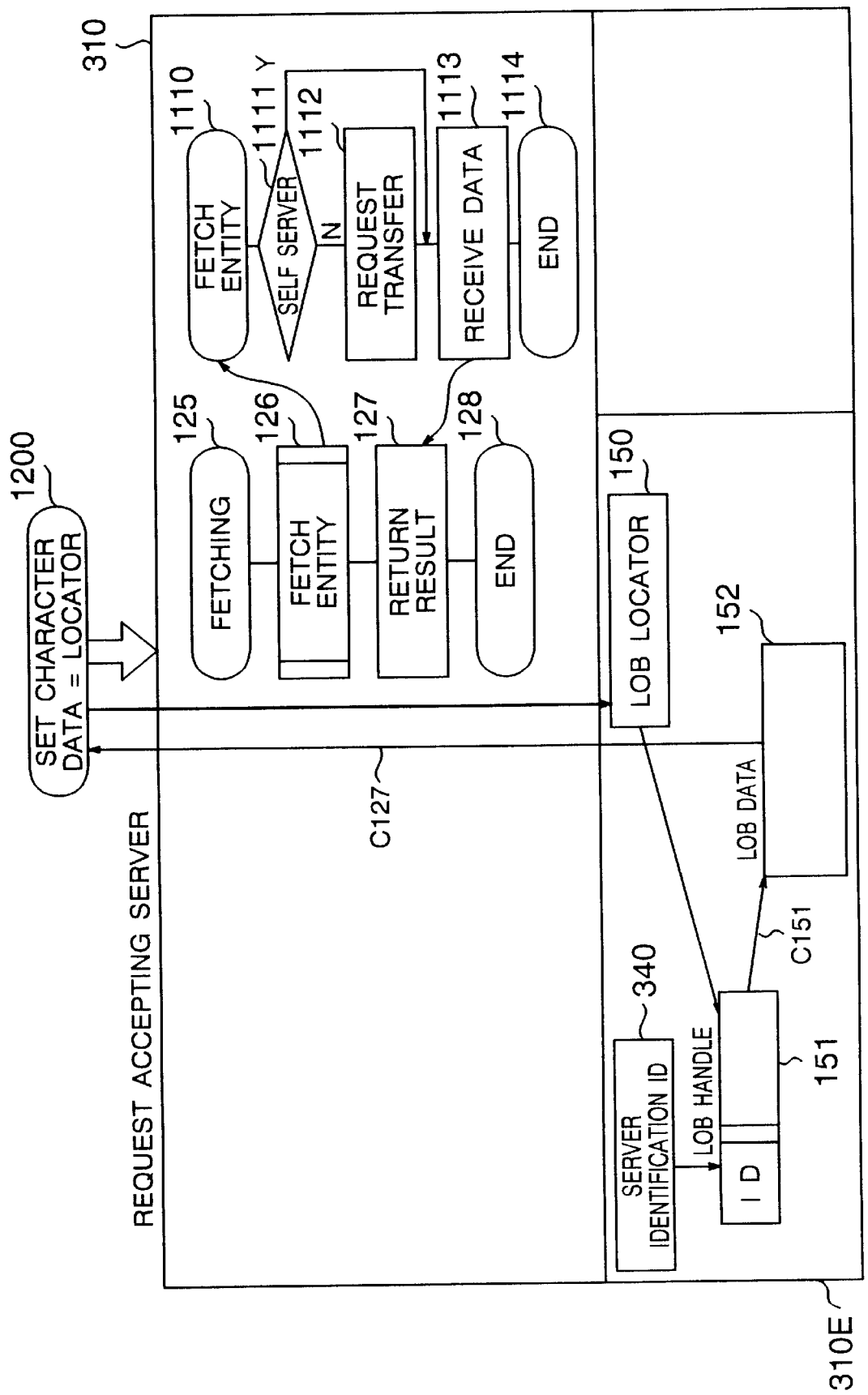
FIG. 14 is a diagram for explaining an example of a fetching process of the LOB data in the embodiment of the invention.

FIG. 14 is a schematic diagram of the fetching process in the case where the handle 151 indicative of the LOB data 152 of the variable in the DBMS in the memory of the request accepting server 310 is designated. In this case, since the storing destination of the LOB handle 151 indicates the memory of the self server 310, the LOB data 152 in the self node, namely, memory 310E is directly fetched from the handle 151 (C115) (step 1113). The fetched LOB data 152 is returned to the UAP (C127) (step 127).

Figure 15:
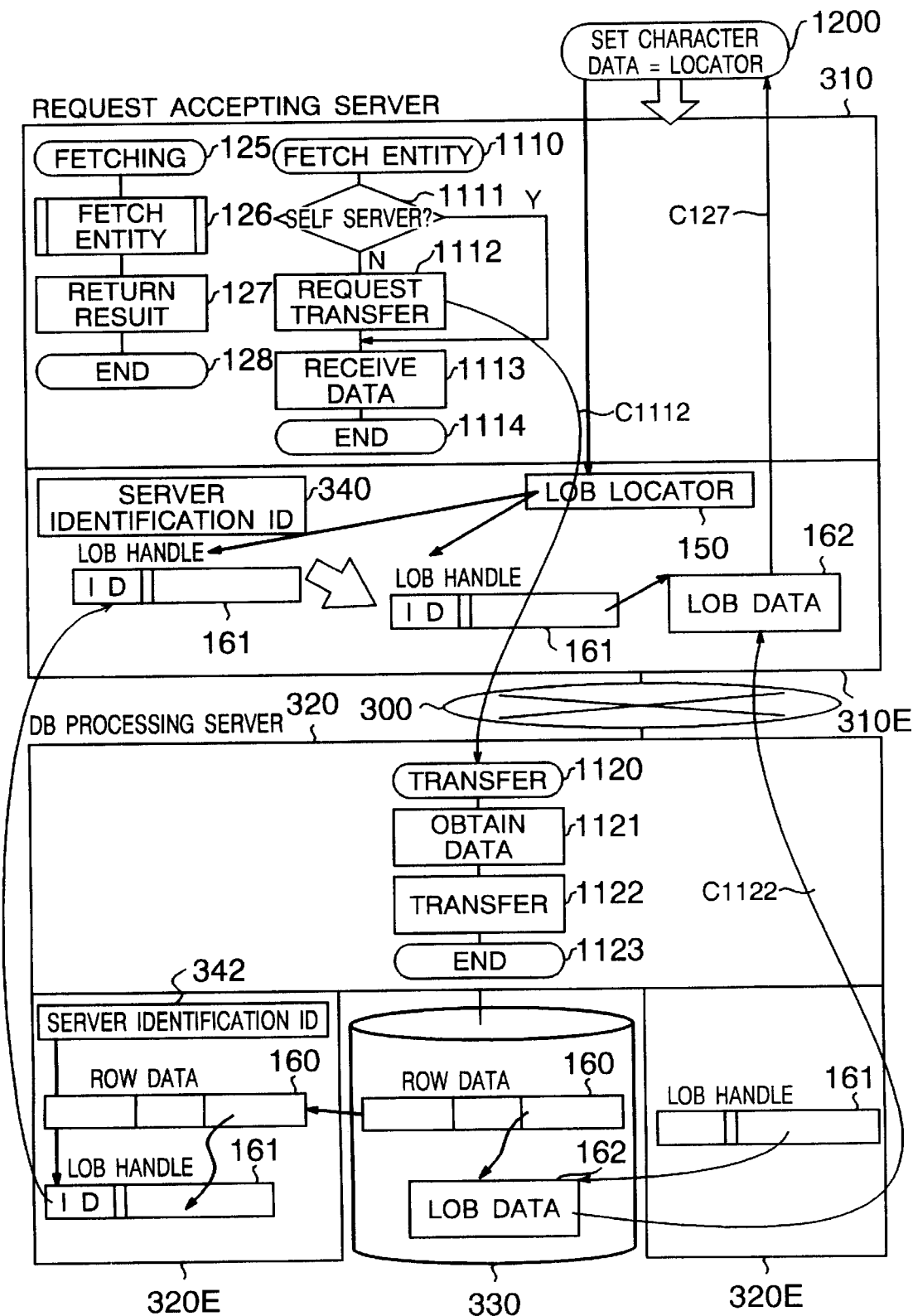
FIG. 15 is a diagram for explaining another example of the fetching process of the LOB data in the embodiment of the invention.

FIG. 15 is a schematic diagram of the fetching process in the case where the handle 161 indicative of the LOB data 162 stored in the DB of the disk drive of the DB processing server is designated. In this case, the value indicative of the DB processing server in which the LOB data has been stored in the DB of the disk drive, for example, server 320 is set in the storage destination of the LOB handle 161. Therefore, the transfer request is sent to the DB processing server 320 together with the handle 161 (C1112) (step 1112). The DB processing server 320 which received the transfer request and the handle executes the transferring process (1120). The transferring process 1120 is the same process as the transferring process 1120 described in FIGS. 12 and 13. By the transferring process 1120, the LOB data 162 in the DB of the disk drive 320 is transferred to the request accepting server 310 (C1122).

The request accepting server 310 receives the LOB data 162 in the entity fetching process and stores it into the server 310 (step 1113). At the time of the storage into the server, a size of LOB data 162 is checked, thereby discriminating whether the LOB data can be stored into the memory 310E or not. When it can be stored into the memory, a memory area for storage is assured in the memory 310E and the LOB data is stored there. When the LOB data cannot be stored into the memory, the it is stored into the file. Further, the value of the LOB handle 161 is updated to the value to point the LOB data stored in the self server. The LOB data 162 finally obtained is returned to the UAP (C127) (step 127).

The fetching process is finished in this manner.

V. Arithmetic operating process

An arithmetic operating process of the LOB data will now be described with reference to FIG. 1. When an arithmetic operation is requested from the UAP, the DBMS processing unit 310A of the request accepting server 310 executes an arithmetic operation executing process 130. First, the entity fetching process of the LOB data designated during the arithmetic operation is executed (step 131). The entity fetching process is the same process as the entity fetching process 126 described in the fetching process 125 to the UAP. After the entity of the LOB data was fetched by the entity fetching process and the LOB handle value was updated, the designated arithmetic operation is executed (step 132). The arithmetic operation result is stored into the server 310 (step 133). The handle corresponding to the LOB data of the arithmetic operation result is formed (step 134). The LOB data storing process (step 133) and the process for forming the LOB handle (step 134) are the same as the processes (steps 111 and 112) performed at the time of the substitution for variable (step 110).

The arithmetic operating process is finished in this manner.

VI. Locator substituting process

Finally, the locator substituting process will now be described with reference to FIG. 16. The locator substituting process is a process for copying the LOB data from a certain locator to another locator. The locator substituting process is designated as follows (100).

SET : locator 1=: locator 2

It is an instruction to copy the LOB data corresponding to the locator 2 to a location corresponding to the locator 1. In a locator substituting process 180, a handle address copy (step 181) is executed. It is a process (1312) for setting the address of the handle 151 pointed by the locator 150 on the substituting source into a locator 1310 of the substituting destination and for counting up an access counter 153 of the relevant handle 151.

By the locator substituting process, two locators 150 and 1310 point the same handle 151. From this state, even in the case where the substitution of a value designating one locator is executed, the point replace process as described in the process for the variable substitution (110) and the process for the arithmetic operation execution (130) is executed, so that no influence is exerted on a state on the other locator side. Therefore, in the locator substituting process, it is sufficient to copy the address of the handle as mentioned above.

The locator substituting process is finished in this manner.

Now, summarizing the above points, the processes can be classified into the case where the process is designated by the SET sentence, the case where it is designated by the SELECT sentence, and the case where it is designated by the INSERT sentence.

The process designated by the SET sentence can be divided into variable substitution, arithmetic operation execution, fetching, and locator substitution as shown in FIG. 5A. Therefore, the handling of the handle in the process of the SET sentence can be summarized as follows.

(1) Variable substitution

When the locator is in the initial state, the LOB data stored in the server is pointed.

When the LOB data is referred by one person, the data which is at present pointed is made free and, after that, the LOB data stored in the server is pointed.

When the LOB data is shared and referred to, the count value of the access counter is reduced by "1", a handle is newly formed, and the LOB data stored in the server is pointed.

(2) Arithmetic operation execution and fetching

On the basis of the handle corresponding to the designated locator,

In the case where the data has been stored in the memory in the self server, it is fetched from the memory.

In the case where the data has been stored in the file in the self server, it is fetched from the file.

In the case where the data has been stored in the other server, a fetching is requested to this server.

(3) Locator substitution

After the access counter of the LOB data was counted up, the handle address is substituted.

The process of the SELECT sentence can be summarized as shown in FIG. 5B. That is, it is as follows.

(1) At the time of the LOB data fetching designation by the cursor retrieval (selection) of the updating designation or the one line retrieval, The LOB data is fetched from the DB and stored into the memory or file in the DB processing server and a handle to point it is formed.

(2) Other than the above

A handle to point the LOB data stored in the DB is formed.

The process of the INSERT sentence is as follows.

The LOB data storing destination is obtained by the handle corresponding to the designated locator and the entity is fetched.

As mentioned above, the control block (LOB handle) to identify the LOB data is prepared and in place of transferring the LOB data, the corresponding LOB handle is transferred. When the LOB data is actually necessary, the transfer of the LOB datan entity is requested by using the LOB handle, thereby delaying the transfer of the real data and avoiding the unnecessary data transfer. The transfer load can be reduced.

Further, by also applying the operation for the LOB type data to the ADT type data, the transfer load of the ADT data can be reduced.

In the ADT type data, the type in which the type was defined can be handled like an ordinary data type. For example, the "address" type can be defined by the following type definition.

```
CREATE VALUE TYPE address
(
    street      CHAR(30),
    city        CHAR(20),
    state       CHAR(2),
    zip         INTEGER);
```

"addr" is a column of the "address" type by the following table definition.

```
CREATE TABLE address book
(
    name        CHAR(10),
    addr        address);
```

Figure 17B:
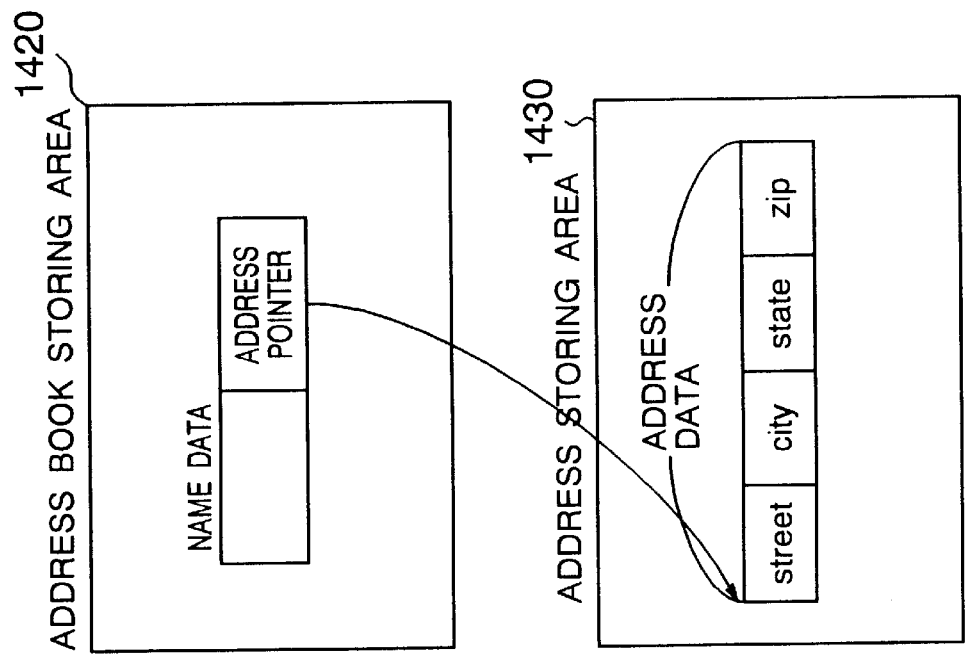
FIGS. 17A and 17B are diagrams for explaining a process to store data of an ADT type into DB of a disk drive.
Figure 17A:
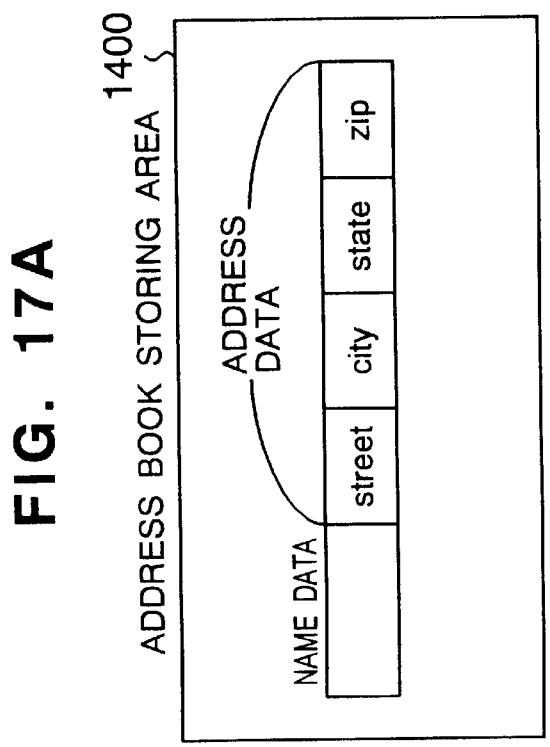

Actually, in case of storing the data of the ADT type into the DB of the disk drive, two kinds of systems are considered: (1) a system in which the data is stored in the same area as that of another column (FIG. 17A); and (2) a system in which the data is stored into another area and pointed from a column storage area (FIG. 17B). It is assumed that the system (1) is used in the case where a size of ADT type data is relatively small and the system (2) is used in the case where a size of ADT type data is large.

Further, the ADT type or LOB type can be also used during the definition of the type of ADTA. In this case, the data of the LOB type is stored into another area and is pointed from the column storage area. As for the ADT type data, either one of the system of storing into the column and the system for storing into another area and pointing is selected in accordance with the size of data.

Each process for the ADT type data will now be described hereinbelow with reference to FIG. 18 on the basis of the above assumption. A fundamental processing procedure is similar to that in case of the LOB type mentioned above.

The process for substituting for the variable will be first described. In FIG. 18, a user inquiry 1500 is sent to the request accepting server 310 together with the ADT locator value, ADT data type information, and data to be substituted. The request accepting server 310 executes a variable substituting process 1510. First, the ADT data to be substituted is obtained and stored into the server (step 1511). When storing the ADT data into the server, an area for storing the ADT data is assured from the ADT data type information and the ADT data is stored therein.

Subsequently, a handle to point the ADT data is formed (step 1512). The handle has the same construction as that in FIG. 4 used in the LOB type and is made up of: the server identifier 400 as a value to identify the server in which the ADT data has been stored; the flags 410, 420, and 430 to indicate a position in the server where the ADT data exists; the values 440, 450, and 460 indicative of the storing position of the ADT data; and the access counter 470 indicative of the number of processes which refer at present to the ADT data.

When executing the process to substitute the ADT data for the variable, two states are considered as a handle: (1) the ADT data is substituted for the variable for the first time; and (2) the ADT data is substituted for the variable in which the substitution has already been performed once or more. Further, in case of (2), two states are considered: a state in which the ADT data which is at present pointed is used by one person; and a state in which it is shared by two or more persons. The ADT handle forming process will be divisionally explained hereinbelow with respect to the above three cases.

(1) In case of substituting for the variable for the first time, since the ADT locator is in an initial state, after the area for the ADT handle was obtained, the server identification ID is set, the memory address in which the ADT data has been stored is set, and the access counter is set to 1.

(2) When the ADT data which is at present pointed is used by one person, the area in which the ADT data has been stored is made free. In a manner similar to the above (1), the server identification ID is set into the handle and the memory storage flag and the memory address in which the ADT data has been stored are set.

(3) When the LOB data shared is pointed, a count value of the access counter of the ADT handle which is at present pointed by the ADT locator is reduced by "1" and an area for storing the ADT handle is newly obtained. In a manner similar to the above (1), the server identification ID is set and the memory storage flag and the memory address in which the ADT data has been stored are set.

When the ADT handle forming process is finished as mentioned above, the address of the ADT handle is set to the ADT locator. The substituting process is finished in this manner.

Figure 19:
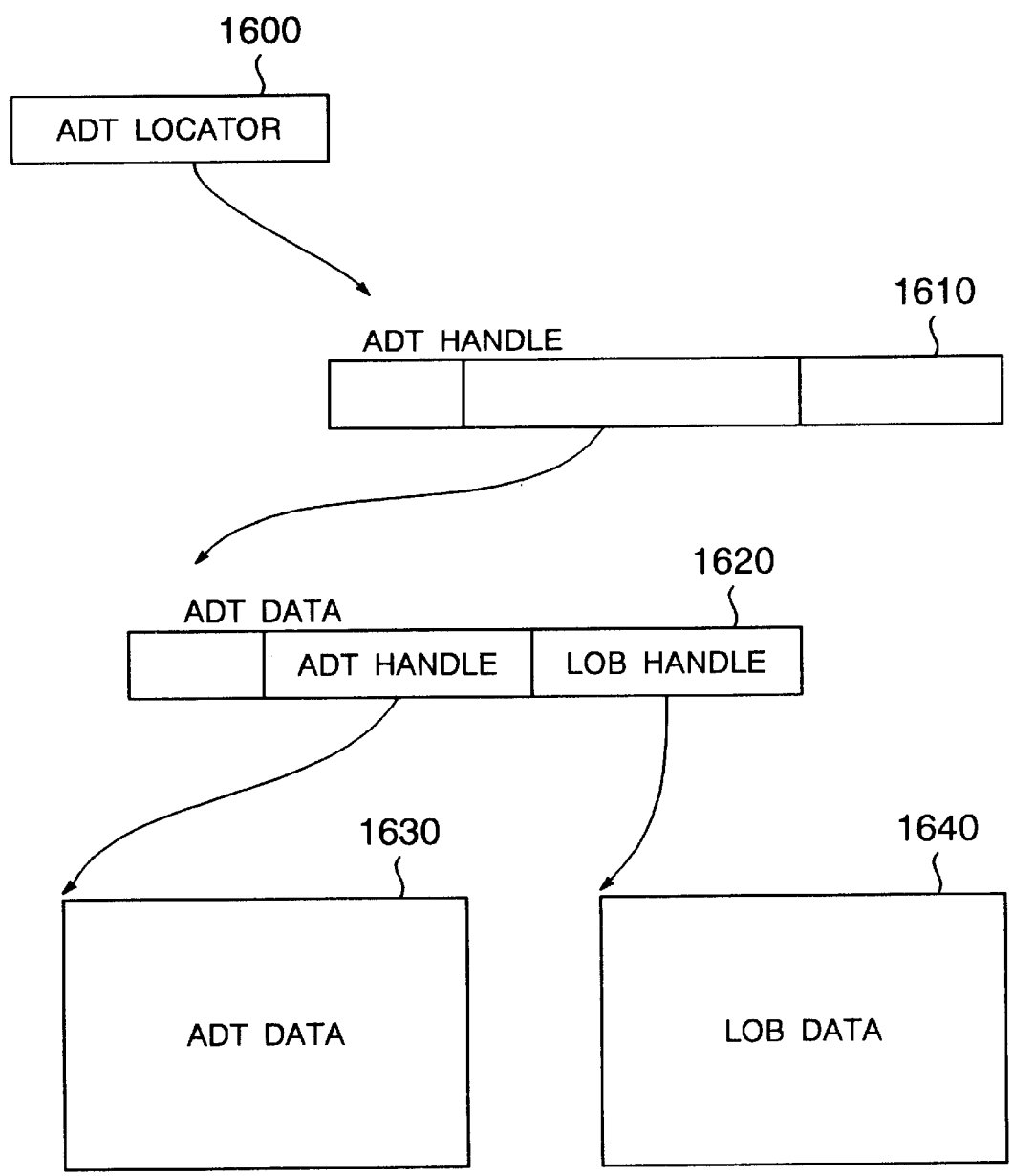
FIG. 19 is a diagram showing a storing process at the time of an ADT definition nest.

In the case where the ADT type or LOB type has already been defined during the ADT definition, as shown in FIG. 19, the ADT type data and the LOB type data are stored into different areas and the handle to point the ADT data and LOB data stored in the different areas is stored in the original ADT data.

A retrieving process will now be described. A retrieving process 1515 is started when a user inquiry is sent to the request accepting server 310 by the SELECT command issued from the UAP. When receiving the retrieving request, the request accepting server 310 sends a retrieval execution request to the group of DB processing servers serving as targets to be retrieved (step 1516). Explanation will now be made hereinbelow on the assumption that the retrieval execution request was performed to the DB processing server 320.

The DB processing server 320 which received the execution request performs a retrieving process 1540. First, the instructed retrieval is executed (step 1541) and the retrieval result is sent to the requesting source. In this instance, when the ADT data is instructed as data to be fetched, an ADT handle 1561 is formed (step 1542) and its value is transferred (step 1543). The identification ID 342 of the server under execution, storage flag, storing position, and access counter initial value are set into the ADT handle 1561.

As mentioned above, there are two cases where the ADT data has been stored in the row and where it has been stored in another area. In the case where the ADT data has been stored in the row, the ADT data is fetched to the memory and a handle to point the ADT data stored in the memory is formed. In the case where the ADT data has been stored in another area, a handle to point the ADT data in the DB is formed.

Figure 18:
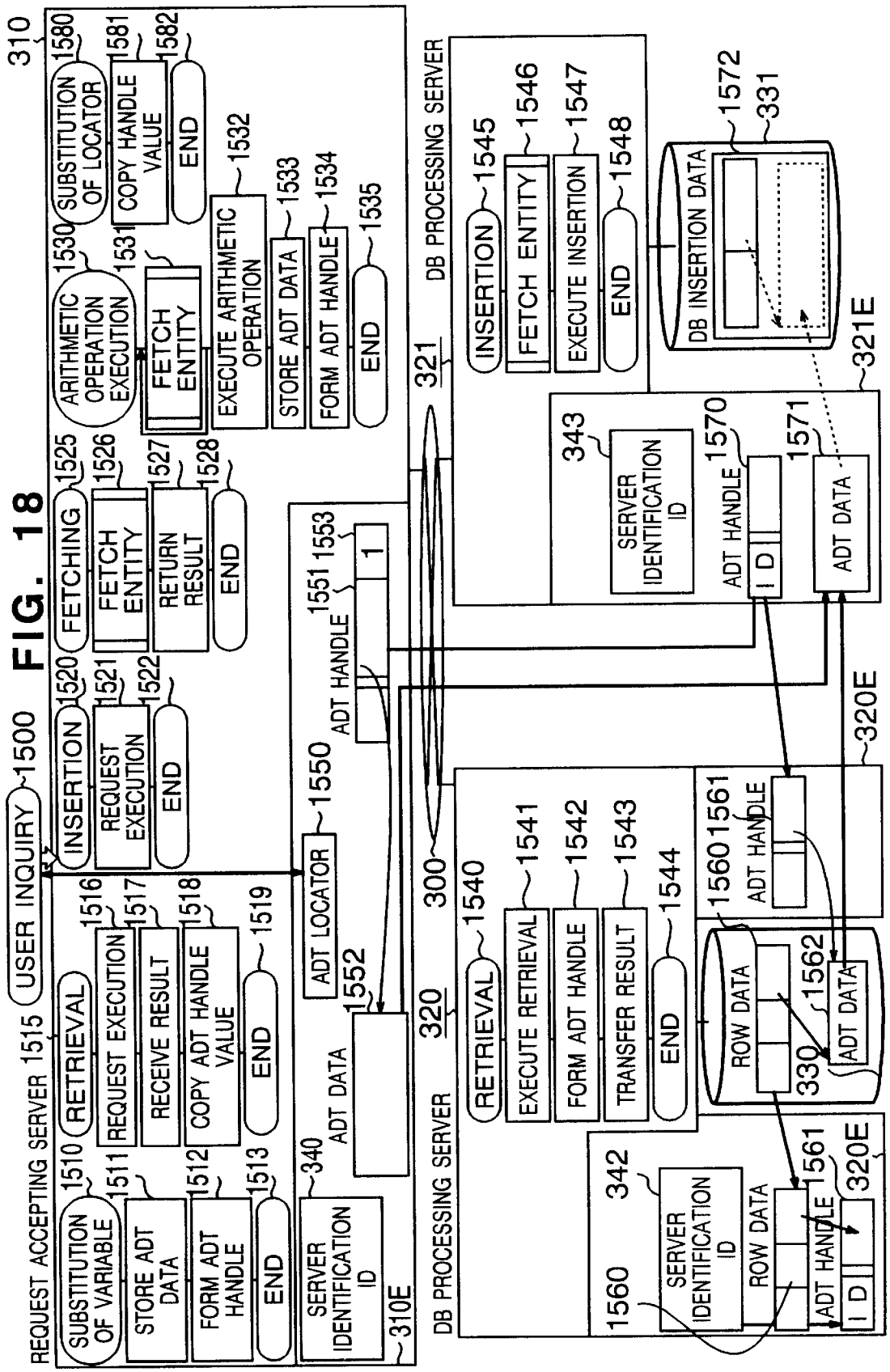
FIG. 18 is a block diagram showing a schematic construction of a database system to which the invention is applied and various processes of ADT type data.

Returning to the description of the retrieving process in FIG. 18. When the retrieval is executed, line data 1560 is fetched and a value corresponding to the ADT data storing position of the line data 1560 is set to the handle 1561 (step 1542). The formed handle 1561 is transferred to the requesting source (step 1543).

The request accepting server 310 receives the retrieval result sent from the DB processing server 320 (step 1517), assures an area to store the handle, and sets the handle in the received retrieval result into the handle storage area (step 1518).

In the retrieving request of the user, the retrieval by the cursor or the one line retrieval is designated. In the cursor retrieval, there is an option to designate a column to be updated after the retrieval. There is a case where a value of the column in which the updating was designated by such an option is changed after the retrieval. On the other hand, even in the one line retrieval, after the result was obtained, the value regarding the obtained line can be updated. In those two cases, in the case where after the ADT data storing position in the DB was stored in the ADT handle and the handle was formed, the value of the column is updated, the data which is pointed by the handle becomes the updated data. Therefore, at the time of the ADT data retrieving process with respect to the column designated as an updating target by the cursor retrieval or the column designated by the one line retrieval, when the handle is formed, the ADT data is certainly fetched from the DB and written into the memory and an ADT handle to point them is formed.

After completion of the processes as mentioned above, the address of the ADT handle assured finally in the request accepting server 310 is set into an ADT locator 1550. The retrieving process is finished.

An inserting process will now be described. An inserting process 1520 is started by the INSERT command from the UAP. Although values of the other elements (columns) in the table are directly designated at the time of insertion, the ADT data is designated by the ADT locator 1550.

When the inserting request 1520 is performed from the user, the request accepting server 310 requests the inserting execution to the relevant DB processing server (step 1521). It is now assumed that the execution request is sent to the DB processing server 321. An ADT handle 1570 is sent as insertion data in this instance. The handle 1570 is an ADT handle 1551 pointed by the ADT locator 1550 designated by the user when requesting the insertion. The DB processing server 321 which received the execution request executes an inserting process 1545. First, a fetching process of the ADT datan entity is executed by the received handle 1570 (step 1546).

The entity fetching process is executed as follows. First, since information to identify the server has been set in the handle as mentioned above, an ADT data storing source server is identified by the handle 1570. When the storing source is the self server, since the data can be referred to as it is, the ADT data is directly referred. When the storing source is another server, a transfer request of the ADT datan entity is sent to the server. At the time of requesting, the handle is added and the transfer request is sent. When the transfer request is sent to the ADT data storing server, the ADT data storing server executes the transferring process. In the transferring process, the ADT datan entity is fetched on the basis of the added handle. Upon fetching of the data, a position where the data has been stored can be discriminated and fetched by the ADT handle. The ADT data storing server transfers the fetched ADT datan entity to the transfer requesting source.

The transfer requesting source receives the transferred ADT datan entity. The ADT datan entity fetching process (step 1546) is finished in this manner.

After receiving the entity of the ADT data, the DB processing server 321 stores those data into the DB (step 1547) and the inserting process is finished. In the case where the ADT type or LOB type has already been defined in the ADT data, there is a case where the value of the target data of the received ADT data is an ADT handle or an LOB handle. In this case, the entity fetching process is again executed on the basis of the handle value.

A fetching process of the ADT data to the UAP will now be described. In the fetching process to the UAP, the ADT locator 1550 of the ADT data to be fetched is instructed. The request accepting server 310 which accepted the request executes a fetching process 1525. First, the ADT datan entity is fetched by the handle shown by the ADT locator 1550 (step 1526). Such an entity fetching process 1526 is a process similar to the entity fetching process 1546 executed in the DB processing server at the time of the foregoing inserting process. When the ADT data to be fetched exists in the self server, since the storage destination of the ADT handle indicates the self server, the ADT data in the self node is directly fetched from the handle by the entity fetching process 1526. When the ADT data to be fetched is the ADT data stored in the DB processing server, since the value indicative of the DB processing server in which the ADT data had been stored has been set in the ADT handle 1551, the transfer is requested to the relevant DB processing server by the entity fetching process 1526. The DB processing server which received the transfer request fetches the instructed ADT data and transfers. In this manner, the ADT data is received and stored into the server in the entity fetching process (step 1526). Further, the value of the ADT handle is updated to the value which points the ADT data stored in the self server. Finally, the obtained ADT data is returned to the UAP (step 1527).

In the case where the ADT type or LOB type has been defined in the ADT data, there is a case where the value of the target data of the received ADT data is the ADT handle or LOB handle. In this case, the entity fetching process is again executed on the basis of the handle value.

The fetching process to the UAP is finished in this manner.

An arithmetic operating process of the ADT data will now be described. When an arithmetic operation is requested from the UAP, the request accepting server 310 executes an arithmetic operation executing process 1530. First, the entity fetching process of the ADT data designated during the arithmetic operation is executed (step 1531). This entity fetching process is the same as the entity fetching process described in the fetching process 1525 to the UAP. After the entity of the ADT data was fetched by the entity fetching process and the ADT handle value was updated, the designated arithmetic operation is executed (step 1532). The arithmetic operation result is stored into the server (step 1533) and a handle corresponding to the ADT data of the arithmetic operation result is formed (step 1534). An ADT data storing process (step 1533) and an ADT handle forming process (step 1534) are the same as the processes (steps 1511 and 1512) performed at the time of the variable substitution (1510).

The arithmetic operating process is finished in this manner.

Finally, a locator substituting process will be explained. The locator substituting process is a process for copying the ADT data from a certain locator to another locator. The locator substituting process is designated (1500) like SET : locator 1=: locator 2

This is an instruction to copy the ADT data corresponding to the locator 2 to a position corresponding to the locator 1. In a locator substituting process 1580, a handle value is copied (step 1581). The handle value copying process is a process for setting the address of the handle which is pointed by the locator of the substituting source into the locator of the substituting destination and for counting up the access counter of the relevant handle.

The locator substituting process is finished in this manner.

As mentioned above, the control block (ADT handle) to identify the ADT data is prepared and the corresponding ADT handle is transferred in place of transferring the ADT data, and when the ADT data is actually necessary, the transfer of the ADT datan entity is requested by using the ADT handle. Thus, the transfer of the real data is delayed, the unnecessary data transfer is avoided, and the transfer load can be reduced.

Although the above embodiment has been described with respect to the LOB data and the ADT data as an example of the processing target data, the invention can be also obviously applied to data of other types.

According to the invention, the control block (handle) to manage an area of the processing target data of a predetermined type such as LOB data, ADT data, or the like is prepared, in place of transmitting and receiving entity data among the servers, the corresponding handle is moved, and when the entity of the processing target data is necessary, the transfer is requested to the entity storing server by the information of the handle and the data is obtained, so that the unnecessary data transfer can be avoided. By storing the information indicating in which server the data exists and the information indicative of the storing position into the handle, when the entity of the processing target data is necessary, the server can easily discriminate the target where the transfer request is sent. When the transfer is requested, by transmitting the handle, which data should be transmitted can be easily known.

The program for executing various processes by the request accepting server in the embodiment can previously be stored in an ROM of the DBMS processing unit of the request accepting server. However, it is also possible to prepare a recording medium (floppy disk, optical disk, CD-ROM, MO, or the like) in which the program has been recorded, to read out the program by a disk drive, and to write it into a memory of the DBMS processing unit. The program can be also written into the memory of the DBMS processing unit of the request accepting server through the network 300. As for the program to execute various processes by the DB processing server, the program can be also similarly stored into the memory of the DBMS processing unit of the DB processing server.

What is claimed is:

1. A database processing method in a parallel database system which comprises request accepting servers each for accepting a processing request of data of a predetermined type and analyzing said request and allocating a process corresponding to said request to either one of said request accepting servers and at least one of database processing server and said at least one database processing server for executing the process allocated by said request accepting servers, and in which said request accepting servers and said at least one database processing server are mutually connected through a network, comprising the steps of:

a) preparing a handle serving as a control block for managing a storage area of data as a processing target;

b) when the data as a processing target corresponding to said processing request is processed in accordance with said processing request, executing a process according to said processing request between said request accepting server having accepted said processing request and said database processing server to which said process was allocated through receiving and transmitting said handle regarding said processing target data corresponding to said processing request there between; and c) obtaining and processing an entity of said processing target data on the basis of said handle when the entity of said processing target data is necessary in said step b).

2. A method according to claim 1, wherein:

said step a) includes a substep of preparing, as said handle, a handle having a server identifier to identify one of said servers in which the data as a processing target corresponding to said processing request has been stored and storing position information indicative of a position in said one of said servers at which said processing target data has been stored;

said step b) includes a substep of designating the data as a processing target corresponding to said processing request by using a locator which is associated in said processing request and designates said handle as a parameter; and said step c) includes a substep of obtaining, when an entity of said processing target data is necessary, the entity of said processing target data which is identified by said server identifier and storing position information of said handle with reference to said handle that is designated by said locator.

3. A method according to claim 2, wherein:

as locations to store the data of the predetermined type, there are memories in said servers, temporary files of external storage devices connected to said servers, and databases of said external storage devices connected to said servers; and said step a) includes a substep of preparing the handle having, as said storing position information, a flag indicating in which one of said memory in said server, said temporary file of said external storage device connected to said server, and said database of said external storage device connected to said server the data has been stored and an address in which the data has been stored.

4. A method according to claim 2, wherein:

said step a) includes a substep of preparing, as said handle, a handle having an area to store an access counter value indicative of a number of references sharing the data as a processing target corresponding to said processing request.

5. A method according to claim 4, further comprising a step of, when one of said request accepting servers accepts a request to substitute the processing target data of said predetermined type for a variable as said processing request, storing said processing target data into said one of said request accepting servers, and further when the handle to identify said processing target data points said processing target data, checking an access counter value of said handle, making free a storage area of said processing target data pointed by said handle when said access counter value is equal to 1, decrementing said access counter value by only 1 when said access counter value is equal to or larger than 2, and counting up said access counter value when same processing target data is referred to by a plurality of handles.

6. A method according to claim 1, wherein the data of said predetermined type is data of a large object (LOB) type or an abstract data type (ADT).

7. A database processing method in a parallel database system which comprises request accepting servers each for accepting a processing request of data of a predetermined type and analyzing said request and allocating a process corresponding to said request to either one of said request accepting servers and at least one database processing server and said at least one database processing server for executing the process allocated by said request accepting servers, and in which said request accepting servers and said at least one database processing server are mutually connected through a network, comprising the steps of:

a) preparing a handle which is a control block for managing a storage area of data as a processing target and which has information with respect to one of said servers in which said processing target data has been stored and a storing location thereof;

b) when the data as a processing target corresponding to said processing request is processed in accordance with said processing request, executing a process according to said processing request by said request accepting server having accepted said processing request by using said handle regarding said processing target data; and c) when an entity of said processing target data is necessary in said step b), obtaining said entity of said processing target data on the basis of said handle and processing.

8. A method according to claim 7, wherein:

said step b) includes a substep of recognizing the server corresponding to said processing target data by referring to the handle corresponding to said processing request, and when said recognized server is said at least one database processing server, transferring the handle corresponding to said processing request to said recognized server together with said processing request, and executing the process of said processing target data corresponding to said processing request in said recognized server.

9. A method according to claim 7, wherein:

said step b) includes a substep of recognizing the server corresponding to said processing request, when said recognized server is said at least one database processing server, transferring said processing request to said recognized server, executing the process with respect to said processing target data corresponding to said processing request and forming a handle in said recognized server, and when said recognized server is said at least one database processing server, transferring said handle to said processing request server.

10. A method according to claim 7, wherein:

said step a) includes a substep of preparing, as said handle, a handle having a server identifier to identify one of said servers in which the data as a processing target corresponding to said processing request has been stored and storing position information indicative of a position in said one of said servers at which said processing target data has been stored;

said step b) includes a substep of designating the data as a processing target corresponding to said processing request by using a locator which is associated in said processing request and designates said handle as a parameter; and said step c) includes a substep of obtaining, when an entity of said processing target data is necessary, the entity of said processing target data which is identified by said server identifier and storing position information of said handle with reference to said handle that is designated by said locator.

11. A parallel database system comprising:

request accepting servers each for accepting a processing request of data of a predetermined type, analyzing said request, and allocating a process corresponding to said request to either one of said request accepting servers and at least one database processing server;

said at least one database processing server for executing the process allocated by said request accepting server having accepted said request; and a network for mutually connecting said request accepting servers and said at least one database processing server, wherein when data as a processing target corresponding to said processing request is processed in accordance with said processing request, said request accepting server having accepted said request and said at least one database processing server to which said process was allocated transmit and receive a handle which is a control block to manage a storage area of said processing target data and which relates to the processing target data corresponding to said processing request between said request accepting server having accepted said request and said database processing server to which said process was allocated, and execute a process according to said processing request, and when the process according to said processing request is executed, in the case where an entity of said processing target data is necessary, the entity of said processing target data is obtained on the basis of said handle and processed.

12. A system according to claim 11, wherein:

said handle has a server identifier for identifying one of said servers in which the processing target data corresponding to said processing request has been stored and storing position information indicative of a position in said one of said servers in which said processing target data has been stored; and either one of said request accepting server having accepted said request and said at least one database processing server designates said processing target data corresponding to said processing request by using a locator which is associated in said processing request and designates said handle as a parameter and obtains an entity of the processing target data which is identified by said server identifier of said handle and said storing position information with reference to the handle that is designated by said locator when the entity of said processing target data is necessary.

13. A parallel database system comprising:

request accepting servers each for accepting a processing request of data of a predetermined type, analyzing said request, and allocating a process corresponding to said request to either one of said request accepting servers and at least one database processing server;

said at least one database processing server for executing the process allocated by said request accepting server having accepted said request; and a network for mutually connecting said request accepting servers and said at least one database processing server, wherein said handle is a control block to manage a storage area of data as a processing target and has information regarding one of said servers in which said processing target data has been stored and a storing position thereof, when the processing target data corresponding to said processing request is processed in accordance with said processing request by one of said request accepting servers, said one of said request accepting servers executes a process according to said processing request by using a handle regarding the processing target data, and when an entity of said processing target data is necessary, the entity of said processing target data is obtained on the basis of said handle and is processed.

14. A system according to claim 13, wherein:

said handle has a server identifier for identifying a server in which the processing target data corresponding to said processing request and storing position information indicative of a position in the server in which said processing target data has been stored; and either one of said request accepting servers having accepted said request and said at least one database processing server designates the processing target data corresponding to said processing request by using a locator which is associated in said processing request and designates said handle as a parameter and obtains an entity of the processing target data which is identified by said server identifier of said handle and said storing position information with reference to the handle that is designated by said locator when the entity of said processing target data is necessary.

15. A system according to claim 14, wherein:

as a position to store said predetermined type of data, there are memories in said servers, temporary files of external storage devices connected to said servers, or a database of said external storage device connected to said server; and as said storing position information, said handle has a flag indicating in which one of the memory one of in said servers, the temporary file of the external storage device connected to said one of said servers, and the database of said external storage device connected to said one of said servers said predetermined type of data has been stored and an address in which said data has been stored.

16. A system according to claim 14, wherein said handle further has an area to store an access counter value indicative of a number of references which share said processing target data corresponding to said processing request.

17. A system according to claim 16, wherein when one of said request accepting servers accepts a request to substitute the processing target data of said predetermined type for a variable as said processing request, said processing target data is stored into said one of said request accepting servers, when the handle to identify said processing target data points said processing target data, an access counter value of said handle is checked, when said access count value is equal to 1, a storage area of said processing target data pointed by said handle is made free, when said access count value is equal to 2 or more, said access counter value is decremented by only 1, and said access counter value is counted up when same processing target data is referred to by a plurality of handles.

18. A system according to claim 13, wherein the data of said predetermined type is data of a large object (LOB) type or an abstract data type (ADT).

19. A system according to claim 13, wherein when one of said request accepting servers accepts a request for substituting the processing target data of said predetermined type for a variable as said processing request, said one of said request accepting servers stores said processing target data therein and forms a handle to identify said processing target data.

20. A system according to claim 13, wherein:

when one of said request accepting servers accepts a request to retrieve the processing target data of said predetermined type as said processing request, said one of said request accepting servers sends said processing request to said at least one database processing server in which said processing target data has been stored; and said at least one database processing server which received said processing request fetches the entity of said processing target data, forms a handle indicative of a storing position of said fetched entity of the data, and transfers said formed handle to said one of said request accepting servers.

21. A system according to claim 13, wherein:

when one of said request accepting servers accepts a request to insert the processing target data of said predetermined type into the database is accepted as said processing request, said one of said request accepting servers transfers a handle to identify said processing target data together with said processing request to said at least one database processing server to execute an insertion; and said at least one database processing server requests the server in which said processing target data has been stored so as to transfer said processing target data by using said transferred handle, obtains said processing target data, and inserts said obtained processing target data into said database shown by said processing request.

22. A system according to claim 13, wherein when one of said request accepting servers accepts a request to fetch the processing target data of said predetermined type as said processing request, said one of said request accepting servers requests the server in which said processing target data has been stored so as to transfer said processing target data by using a handle to identify said processing target data and fetches said processing target data.

23. A system according to claim 13, wherein when one of said request accepting servers accepts a request to arithmetically operate the processing target data of said predetermined type is accepted as said processing request, said one of said request accepting servers requests the server in which said processing target data has been stored so as to transfer said processing target data by using a handle to identify said processing target data, obtains said processing target data, and executes an arithmetic operation designated by said processing request with respect to said processing target data obtained.

24. A computer program embodied on a computer-readable medium for use in a parallel database system which comprises request accepting servers each for accepting a processing request of data of a predetermined type, analyzing said request, and allocating a process corresponding to said request to either one of said request accepting servers and at least one database processing server and said at least one database processing server for executing the process allocated by said request accepting server and in which said request accepting servers and said at least one database processing server are mutually connected through a network, comprising:

program code means having a handle which is a control block to manage a storage area of data as a processing target and which has information with respect to one of said servers in which said processing target data has been stored and a storing position thereof;

program code means for, when one of said request accepting servers processes the processing target data corresponding to said processing request in accordance with said processing request, allowing a process according to said processing request to be executed by said one of said request accepting servers by using a handle regarding the processing target data; and program code means for, when the process according to said processing request is executed and in the case where an entity of said processing target data is necessary, obtaining the entity of said processing target data on the basis of said handle and processing.

\* \* \* \* \*